(12) United States Patent
Harada et al.

(10) Patent No.: US 11,309,533 B2
(45) Date of Patent: Apr. 19, 2022

(54) COMPOSITE OXIDE, ACTIVE MATERIAL COMPOSITE MATERIAL, ELECTRODE, BATTERY, BATTERY PACK, AND VEHICLE

(71) Applicant: KABUSHIKI KAISHA TOSHIBA, Minato-ku (JP)

(72) Inventors: Yasuhiro Harada, Isehara (JP); Norio Takami, Yokohama (JP); Kazuomi Yoshima, Yokohama (JP); Yasunobu Yamashita, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 147 days.

(21) Appl. No.: 16/802,656

(22) Filed: Feb. 27, 2020

(65) Prior Publication Data

US 2021/0083263 A1    Mar. 18, 2021

(30) Foreign Application Priority Data

Sep. 13, 2019 (JP) .............................. JP2019-167678

(51) Int. Cl.
| | |
|---|---|
| *H01M 4/131* | (2010.01) |
| *H01M 50/20* | (2021.01) |
| *B60W 30/18* | (2012.01) |
| *H01M 4/36* | (2006.01) |

(52) U.S. Cl.
CPC ...... *H01M 4/131* (2013.01); *B60W 30/18127* (2013.01); *H01M 4/366* (2013.01); *H01M 50/20* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 10,230,099 | B2 | 3/2019 | Uchiyama |
| 2009/0081554 | A1 | 3/2009 | Takada et al. |

FOREIGN PATENT DOCUMENTS

| | | |
|---|---|---|
| EP | 3 539 927 A1 | 9/2019 |
| WO | WO 2007/004590 A1 | 1/2007 |
| WO | WO 2012/160707 A1 | 11/2012 |
| WO | WO 2015/185129 A1 | 12/2015 |

OTHER PUBLICATIONS

Trevey, J. E. et al., "High lithium ion conducting $Li_2S$—$GeS_2$—$P_2S_5$ glass-ceramic solid electrolyte with sulfur additive for all solid-state lithium secondary batteries," Electrochimica Acta, vol. 56, Issue 11, 2011, pp. 4243-4247.

*Primary Examiner* — Wyatt P McConnell
(74) *Attorney, Agent, or Firm* — Oblon, McClelland, Maier & Neustadt, L.L.P.

(57) ABSTRACT

According to one embodiment, provided is a composite oxide containing lithium, niobium, and tantalum. A mass ratio of tantalum with respect to niobium is in a range of from 0.01% to 1.0%.

17 Claims, 7 Drawing Sheets

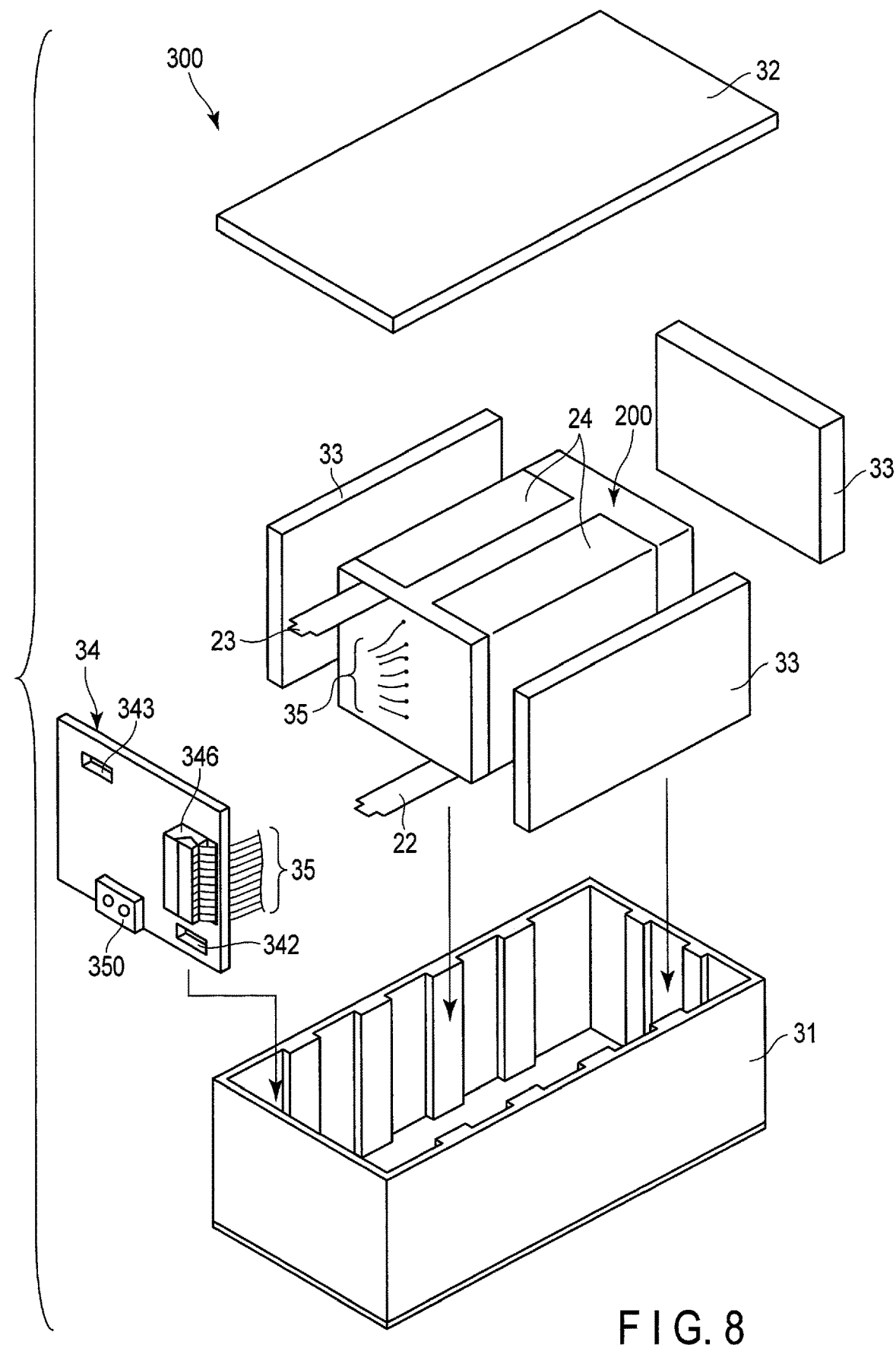
F I G. 8

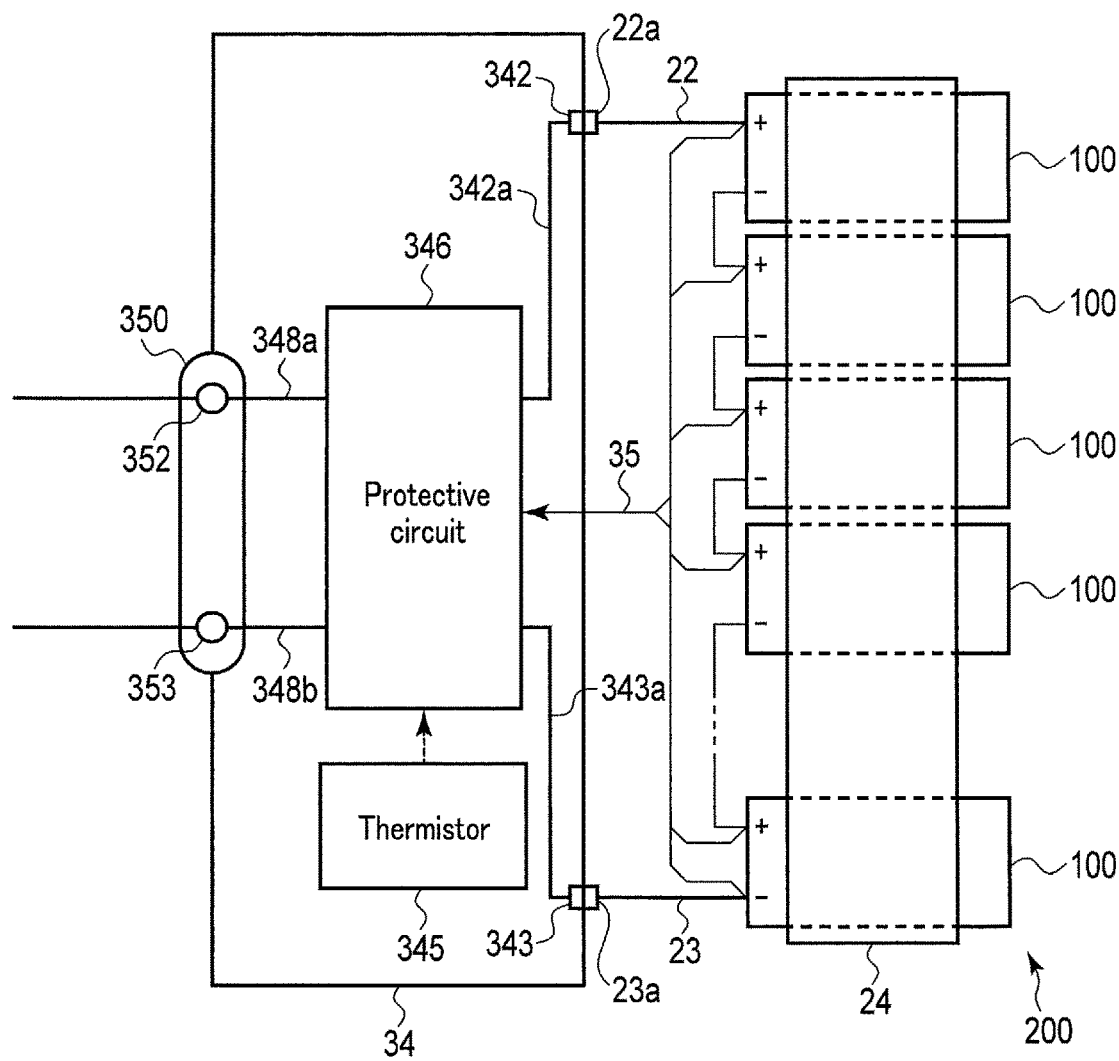
F I G. 9
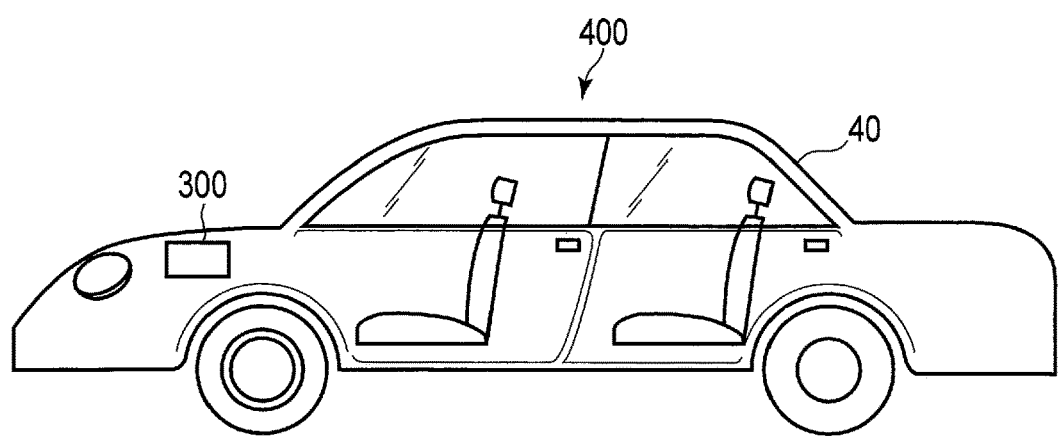
F I G. 10

COMPOSITE OXIDE, ACTIVE MATERIAL COMPOSITE MATERIAL, ELECTRODE, BATTERY, BATTERY PACK, AND VEHICLE

CROSS-REFERENCE TO RELATED APPLICATION

This application is based upon and claims the benefit of priority from Japanese Patent Application No. 2019-167678, filed Sep. 13, 2019, the entire content of which is incorporated herein by reference.

FIELD

Embodiments relate to a composite oxide, an active material composite material, an electrode, a battery, a battery pack, and a vehicle.

BACKGROUND

In recent years, lithium ion secondary batteries with high energy density have received great attention for wide application from use in small electronic devices to large-scale use such as that in hybrid electric automobiles, electric automobiles, and stationary power sources for power storage. Among them, a lithium ion secondary battery using an inorganic solid electrolyte is anticipated as a safe battery since there is no concern for leakage of an organic electrolytic solution or gas generation. In addition, as compared to batteries using liquid electrolyte, the lithium battery using the solid electrolyte has a low probability of side reactions other than battery reactions, and thus, long life span of the battery can be expected. Further, with an all-solid battery using an inorganic solid electrolyte, a battery can be easily configured by stacking the electrodes and electrolyte, thereby reducing manufacturing cost. At the same time, when the inorganic solid electrolyte is used, a bipolar battery configuration is also possible. Thereby, a higher energy density is anticipated as compared to conventional batteries using liquid electrolyte.

Meanwhile, in all-solid batteries, an active material layer (electrode layer) and an electrolyte layer are solid. Accordingly, the area of contact between the electrolyte and the active material is low, and the resistance thus tends to become high. A countermeasure is to use an electrode layer in which solid electrolyte powder is mixed into the active material layer, whereby the contact area can be increased.

As a solid electrolyte for all-solid batteries, oxides and sulfides have been considered. Among them, a sulfide-based solid electrolyte has high Li ion conductivity at room temperature. On top of that, particles of sulfide-based solid electrolytes are soft, which provide good contact with an active material. Therefore, in one hand, the sulfide-based solid electrolyte is effective in lowering the resistance of the all-solid battery. On the other hand, there is a problem in that, at the interface between the active material and the sulfide-based solid electrolyte, the interface resistance upon migration of Li ions tends to increase. This is considered to be due to the active material and the sulfide-based solid electrolyte reacting to form a high resistance layer on the active material surface. An increase in interface resistance causes the internal resistance of the all-solid battery to increase, and as a result, charge and discharge performance deteriorates. In view of such a situation, there has been disclosed a technique for reducing interface resistance, where the active material surface is coated with lithium niobate ($LiNbO_3$).

BRIEF DESCRIPTION OF THE DRAWINGS

FIG. 8 is an exploded perspective view showing an example of a battery pack according to an embodiment;

FIG. 9 is a block diagram showing an example of an electric circuit of the battery pack shown in FIG. 8;

FIG. 10 is a partially see-through diagram schematically showing an example of a vehicle according to an embodiment.

DETAILED DESCRIPTION

Figure 1:
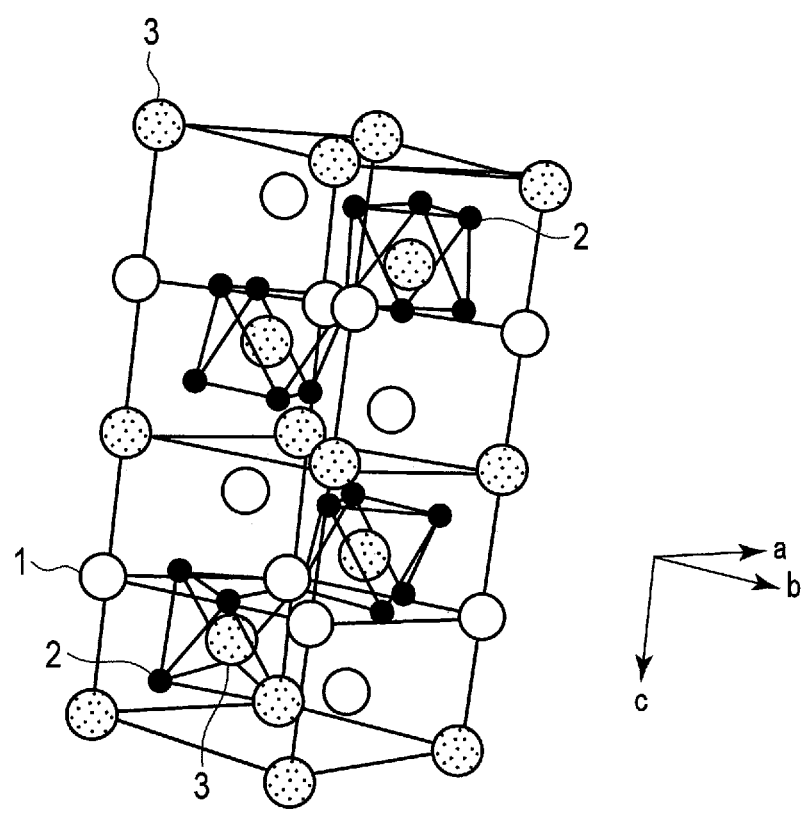
FIG. 1 is a schematic diagram showing a crystal structure of a composite oxide according to an embodiment.

According to one embodiment, provided is a composite oxide containing lithium, niobium, and tantalum. A mass ratio of tantalum with respect to niobium is in a range of from 0.01% to 1.0%.

According to another embodiment, provided is an active material composite material including an active material particle and a composite oxide-containing layer. The composite oxide-containing layer is in contact with at least part of a surface of the active material particle. The composite oxide-containing layer contains the composite oxide according to the above embodiment.

According to a further other embodiment, provided is an electrode including an active material-containing layer and a composite oxide-containing layer. The active material-containing layer contains an active material. The composite oxide-containing layer is in contact with at least a portion of a surface of the active material. The composite oxide-containing layer contains the composite oxide according to the above embodiment.

According to still another embodiment, provided is a battery including a positive electrode active material-containing layer, a negative electrode active material-containing layer, an electrically-insulating layer, and a composite oxide-containing layer. The positive electrode active material-containing layer contains a positive electrode active material. The negative electrode active material-containing layer contains a negative electrode active material. The electrically-insulating layer contains a second sulfide solid electrolyte. The electrically-insulating layer is disposed between the positive electrode active material-containing layer and the negative electrode active material-containing layer. The composite oxide-containing layer is in contact with at least part of the positive electrode active material. The composite oxide-containing layer contains the composite oxide according to the above embodiment.

According to a still further other embodiment, provided is a battery pack including the battery according to the above embodiment.

According to yet another embodiment, provided is a vehicle including the battery pack according to the above embodiment.

Hereinafter, embodiments will be described with reference to the drawings. The same reference signs are applied to common components throughout the embodiments and overlapped explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

First Embodiment

According to a first embodiment, provided is a composite oxide containing lithium, niobium, and tantalum. A mass ratio ($M_{Ta}/M_{Nb}$) of tantalum (Ta) to niobium (Nb) is within a range of from 0.01% to 1.0%.

A composition containing the above composite oxide may be used as a composition for battery electrodes. For instance, the composite oxide-containing composition may be used for a composition for use in positive electrodes, as a layer provided at an interface between the positive electrode active material and sulfide solid electrolyte, and suppressing interface reaction.

On the surface of a positive electrode included in a battery, a high potential is apt to be continuously applied thereto. This causes the crystal structure of lithium niobate to be unstable, when the positive electrode active material is coated with lithium niobate. At a high temperature of 40° C. or higher, in particular, it is not easy to stably maintain the crystal structure of lithium niobate.

A composite oxide according to the embodiment includes lithium niobate ($LiNbO_3$) as a main component and tantalum (Ta), and optionally includes potassium (K) and iron (Fe). This composite oxide may correspond to a compound in which part of niobium in the crystal structure of $LiNbO_3$ is substituted by tantalum. A potassium-containing composite oxide may correspond to a compound in which part of lithium in the crystal structure is substituted by potassium. An iron-containing composite oxide may correspond to a compound in which part of niobium in the crystal structure is substituted by iron.

In each composite oxide, by virtue of having part of Nb in the crystal structure be Ta, bonding to oxide ions is enhanced, whereby the crystal structure stability is improved as compared with that of unsubstituted $LiNbO_3$. With a composite oxide-containing layer using the composite oxide as a reaction-suppression layer, the interface reaction between the active material surface and the solid electrolyte can be suppressed thereby continuously suppressing an increase in resistance, over a long period of time. Performance of the composite oxide can be maintained under high-temperature conditions at 40° C. or higher. Namely, batteries using this electrode-use composite oxide in a reaction-suppression layer excel in high temperature storage performance.

When the mass ratio $M_{Ta}/M_{Nb}$ of the mass of tantalum ($M_{Ta}$) to the mass of niobium ($M_{Nb}$) is in a range of from 0.01% to 1.0%, the crystal structure can be stabilized at high temperatures. When the mass ratio $M_{Ta}/M_{Nb}$ is 0.01% ($=1\times10^{-4}$) or more, the above effect can be obtained. When the mass ratio $M_{Ta}/M_{Nb}$ is 1.0% ($=0.010$) or less, favorable Li conductivity can be maintained. If the niobium is substituted by tantalum at an amount such that the mass ratio $M_{Ta}/M_{Nb}$ exceeds 1.0%, flexibility of the crystal lattice is impaired. Consequently, the crystal lattice becomes rigid, and Li conductivity is thus lowered. It is preferable that the mass ratio $M_{Ta}/M_{Nb}$ of tantalum to niobium is from 0.03% to 0.5%.

The composite oxide may further contain potassium. The mass ratio $M_K/M_{Nb}$ of the mass of potassium ($M_K$) to the mass of niobium ($M_{Nb}$) in the composite oxide may be in a range of from 0% to 1.0%. By making part of lithium (Li) be potassium (K), reaction between the composite oxide and the solid electrolyte layer can be decreased. It is desirable that the mass ratio ($M_K/M_{Nb}$) of potassium to niobium in the composite oxide is in a range of from 0.05% to 1.0%. When the mass ratio $M_K/M_{Nb}$ is 0.05% ($=5\times10^{-4}$) or more, the above effect can be obtained. When the mass ratio $M_K/M_{Nb}$ is 1.0% ($=0.010$) or less, favorable Li conductivity can be maintained. If the lithium is substituted by potassium at an amount such that the mass ratio $M_K/M_{Nb}$ exceeds 1.0%, the Li conduction path is inhibited, and the Li conductivity is thus lowered. The mass ratio $M_{Li}/M_{Nb}$ of the mass of lithium ($M_{Li}$) to the mass of niobium ($M_{Nb}$) in the composite oxide may be in a range of from 6.0% to 8.0%. It is preferable that both Ta and K are used in the composite oxide having lithium niobate as primary component. This is because, this makes it possible to simultaneously achieve the above-mentioned crystal structure stability and improvement in reaction suppression ability.

The composite oxide may further contain iron. The mass ratio $M_{Fe}/M_{Nb}$ of the mass of iron ($M_{Fe}$) to the mass of niobium ($M_{Nb}$) in the composite oxide may be in a range of from 0.0% to 0.5%. On the positive electrode surface, electron transfer in addition to Li ion transfer is carried out. Therefore, it is preferable to give electrical conductivity to the composite oxide-containing layer covering the positive electrode, because the internal resistance of battery can be reduced. It is desirable that the mass ratio $M_{Fe}/M_{Nb}$ of iron to niobium is from 0.01% to 0.5%. When the mass ratio $M_{Fe}/M_{Nb}$ is 0.01% ($=1\times10^{-4}$) or more, the above effect can be obtained. When the mass ratio $M_{Fe}/M_{Nb}$ is 0.5% ($=5\times10^{-3}$) or less, the crystal structure can be maintained stably. If the niobium is substituted by iron at an amount such that the mass ratio $M_{Fe}/M_{Nb}$ exceeds 0.5%, there is higher degree of contribution by the composite oxide in the composite oxide-containing layer to a redox reaction at the operating potential of a positive electrode, causing the structure to be unstable. Therefore, such an excessive amount is not preferable.

The above composite oxide may be represented by general formula $Li_{1-x}K_xNb_{1-y-z}Ta_yFe_zO_3$. Assume here, that the atomic weight of lithium is 6.94, the atomic weight of potassium is 39.1, the atomic weight of niobium is 92.91, the atomic weight of tantalum is 180.95, and the atomic weight of iron is 55.85. In the general formula, the mass of each element can be respectively calculated as $6.94\times(1-x)$ for lithium, $39.1\times x$ for potassium, $92.91\times(1-y-z)$ for niobium, $180.95xy$ for tantalum, and $55.85\times z$ for iron. Accordingly, the range of subscript x can be determined from the mass ratio of potassium to niobium, and therefore "$(39.1\times x)/\{92.91\times(1-y-z)\}\times100\%$" is in a range of from 0% to 1.0%. The subscript x may be within a range of $0 \leq x \leq 2.4\times10^{-2}$. The composition in which the subscript x is within a range of $1.2\times10^{-3} \leq x \leq 2.4\times10^{-2}$ is preferable. Likewise, from the mass ratio of tantalum to niobium, "$(180.95xy)/\{92.91\times(1-y-z)\}\times100\%$" ranges from 0.01% to 1.0%. Subscript y may be within a range of $5.1\times10^{-5} \leq y \leq 5.1\times10^{-3}$. From the mass ratio of iron to niobium, "$(55.85\times z)/\{92.91\times(1-y-z)\}\times 100\%$" is from 0.0% to 0.5%. Subscript z may be within a range of $0 \leq z \leq 8.2\times10^{-3}$. A composition in which the subscript z is within a range of $1.7\times10^{-4} \leq z \leq 8.2\times10^{-3}$ is preferable.

The composite oxide, like unsubstituted $LiNbO_3$, has a crystal structure of a trigonal crystal structure. This crystal structure is described with reference to a drawing. FIG. 1 is a schematic diagram showing the crystal structure of a composite oxide according to an embodiment. Four alkali atoms 1 arranged in a planar fashion and four transition metal atoms 3 arranged in a planar fashion are alternately aligned in the c-axis direction to form a crystal lattice. At the same time, plural octahedrons, each of which contain a transition metal atom 3 and six oxygen atoms 2 arranged centered on the transition metal atom 3 as a center metal, are arranged within the crystal lattice. The crystal lattice also contains alkali atoms 1 that do not belong to either the lattice framework or the octahedron.

The alkali atoms 1 may be lithium atoms (or Li ions) or may include both lithium atoms and potassium atoms (or K ions). That is, the lithium and potassium in the composite oxide occupy sites of the alkali atoms 1 within the crystal structure. The transition metal atoms 3 include niobium atoms (or Nb cations) and tantalum atoms (or Ta cations), and may further optionally include iron atoms (or Fe ions). That is, the niobium, tantalum, and iron in the composite oxide occupy sites of the transition metal atoms 3 within the crystal structure.

<Synthesis of Composite Oxide>

The above-described composite oxide may be synthesized by, for instance, a solid phase reaction. Raw materials that can be used include lithium carbonate ($Li_2CO_3$), potassium carbonate ($K_2CO_3$), niobium oxide ($Nb_2O_5$), tantalum oxide ($Ta_2O_5$), and iron oxide ($Fe_2O_3$). These raw materials are weighed at a desired composition ratio, and the mixture is mixed using a ball mill for 1 hour. Next, the raw material mixture is heated and pre-fired at 850° C. for a period of from 2 hours to 10 hours. Subsequently, the resulting pre-fired material is pulverized for 1 hour using the ball mill again, and the pulverized powder is then fired at 1000° C. for a period of from 3 hours to 10 hours. After firing, the particle size may be adjusted using a bead mill. For instance, the fired powder may be pulverized with a bead mill to yield microparticles of composite oxide with an average particle size (d50) of from 1 nm to 500 nm.

<Measurement of Composite Oxide>

Hereinafter, a method of measuring the composite oxide will be described. Specifically, a transmission electron microscope-energy-dispersive X-ray spectrometry measurement and an inductively-coupled plasma emission spectrometry analysis will be described.

When a target composite oxide to be measured is included in a battery, for instance, the measurement sample is taken out of the battery by a method described as follows.

In, for example, an all-solid battery including a later described electrode body having a structure constructed by stacking a positive electrode active material-containing layer, a negative electrode active material-containing layer, and an electrically-insulating layer, the composite oxide may be included in the positive electrode active material-containing layer. Alternatively, the composite oxide may be contained in a composite oxide-containing layer positioned between the positive electrode active material-containing layer and the electrically-insulating layer. First, the battery is brought into a completely discharged state. For example, the battery can be put into the discharged state by discharging the battery in a 25° C. environment at 0.1 C current to a rated end voltage. The electrode body is taken out from the battery. From the electrode body taken out, the active material-containing layer containing the measurement target, for instance, the positive electrode active material-containing layer is scraped out. Alternatively, the composite oxide-containing layer can be extracted by shaving off the positive electrode active material-containing layer, the negative electrode active material-containing layer, and the electrically-insulating layer by polishing. The scraped-out active material-containing layer or the extracted composite oxide-containing layer is pulverized until an average particle diameter is about 10 μm. The average particle diameter may be determined by laser diffraction. In this manner, a measurement sample including the composite oxide can be obtained.

(Transmission Electron Microscopy-Energy-Dispersive X-Ray Spectrometry)

A distribution of Ta in the crystal structure of the composite oxide can be examined by a measurement through transmission electron microscopy-energy dispersive x-ray spectroscopy (TEM-EDX). A target sample, including a composite oxide and sampled by the above-described method, is subjected to a TEM-EDX measurement to identify a crystal structure of each particle in the sample by a selected area diffraction method. For example, when an active material-containing layer including the composite oxide is used for a measurement sample, an electrode active material may be included in the sample, aside from the composite oxide. The composite oxide and the electrode active material can be distinguished from each other by identifying the crystal structures thereof. A distribution of Ta can be determined by obtaining a mapping of Ta by EDX.

Distributions of the other elements in the crystal structure, such as Nb, K, and Fe, can also be determined by obtaining mappings.

(Inductively-Coupled Plasma Emission Spectrometry)

If it has been confirmed from the results of respective mappings by the TEM-EDX that target elements are included in the crystal structure, a quantitative analysis can be performed by high frequency inductively-coupled plasma (ICP) emission spectroscopy. The mass ratio of each of various elements (Li, Ta, K, Fe) with respect to Nb can be calculated through quantitative analysis.

Here, the mass ratio of respective elements depends on the sensitivity of an analyzer used. Therefore, for example, when a composition of an oxide included in an example of a composite oxide according to the first embodiment is analyzed using ICP emission spectroscopy, there may be a case where a numerical value deviates by an error of the measurement device from the mass ratio described above. However, the example of the composite oxide according to the first embodiment can sufficiently exert the advantageous effects explained above, even if the measurement result deviates as described above within an error range of the analyzer.

The composite oxide according to the first embodiment contains lithium, niobium, and tantalum. A mass ratio of tantalum to niobium in the composite oxide is within a range of from 0.01% to 1.0%. By using a composite oxide-containing layer containing this composite oxide in a battery including a sulfide solid electrolyte, interface reaction between the active material surface and the sulfide solid electrolyte can be suppressed, and an increase in the internal resistance of the battery can be suppressed over a long period of time, even under a high-temperature environment.

Accordingly, it is possible to provide a battery exhibiting low internal resistance and excellent high temperature storage performance.

Second Embodiment

According to a second embodiment, provided is an active material composite material including an active material particle and a composite oxide-containing layer in contact with at least part of a surface of the active material particle. The composite oxide-containing layer contains the composite oxide according to the first embodiment.

The composite oxide-containing layer can serve as a reaction-suppression layer by which interface reaction between the active material surface and the solid electrolyte is suppressed. The composite oxide according to the first embodiment has a stable crystal structure as described above. Thus, when the composite oxide-containing layer is used, the effect of suppressing the interface reaction can be exerted over a long time span, making an increase in resistance small. In addition, the composite oxide-containing layer can keep exerting the effect over a long term even under high-temperature conditions at 40° C. or higher.

In an active material composite material, the composite oxide-containing layer may cover a surface of the active material particle. It is desirable that the entire surface of the active material particle is coated.

The active material particles may be single primary particles, secondary particles that are primary particle agglomerates, or a mixture of the single primary particles and the secondary particles. The shape of each primary particle is not particularly limited and, for instance, may be spherical, elliptical, flat, or fibrous. Regarding the active material in secondary particle form, the secondary particle surface may have undulations and bumpiness caused by agglomerated primary particles. The undulations and bumpiness on the secondary particle surface give an effect of anchoring the composite oxide-containing layer, so that the composite oxide-containing layer is unlikely to detach from the active material particles. Because of this, active material particles in a form of secondary particles are preferable.

When being single primary particles, the active material preferably has an average primary particle size (D50) of from 0.5 μm to 15 μm, and more preferably from 1 μm to 10 μm. When the primary particles are agglomerated to form secondary particles, the primary particles included in the secondary particles preferably have an average primary particle size of 1 μm or less, and more preferably from 0.05 μm to 0.5 μm. The secondary particles preferably have an average secondary particle size (D50) of from 0.6 μm to 20 μm, and more preferably from 1 μm to 10 μm.

The thickness of the composite oxide-containing layer on the active material surface may be set to a thickness such that, for instance, lithium ion conductivity is secured while the reaction between the active material and the sulfide-based solid electrolyte is suppressed to prevent formation of a portion of high resistance. The composite oxide-containing layer preferably has a thickness of from 1 nm to 500 nm, and more preferably from 1 nm to 20 nm. When the composite oxide-containing layer is too thick, the lithium ion conductivity tends to decrease. When the composite oxide-containing layer is too thin, there is occurrence of sites where a surface of the active material is partially exposed. This may induce a reaction of the positive electrode active material with the sulfide-based solid electrolyte, thereby forming high-resistance sites.

As the active material, for example, an oxide or a sulfide may be used. The active material composite material may singly include one compound as the active material, or alternatively, include two or more compounds in combination. Examples of the oxide and sulfide include compounds capable of having Li and/or Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates ($Fe_2(SO_4)_3$), vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

The active material may be included as a positive electrode active material in appositive electrode in battery. Among the above compounds, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). When these compounds are used for the positive electrode active material, the positive electrode potential can be made high.

Figure 2:
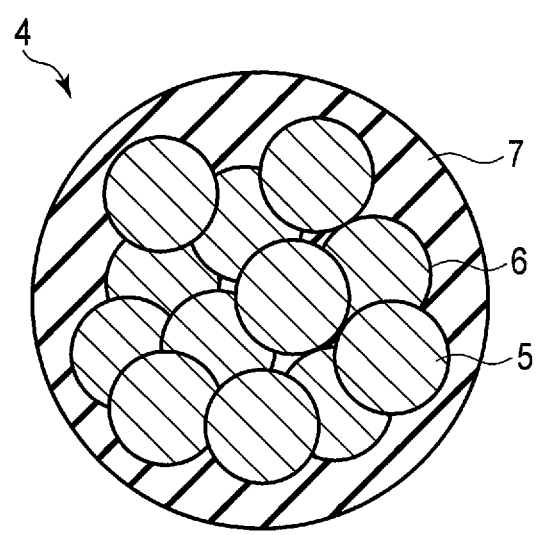
FIG. 2 is a schematic cross-sectional diagram showing an example of an active material composite material according to the embodiment.

With reference to FIG. 2, a specific example of the active material composite material is described. FIG. 2 is a schematic cross-sectional diagram showing an example of an active material composite material according to the embodiment. The active material composite material particle 4 shown in FIG. 2 is a particulate active material composite material including an active material secondary particle 6 and a composite oxide-containing layer 7. The active material secondary particle 6 contains plural active material primary particles 5. The composite oxide-containing layer 7 contains the composite oxide according to the first embodiment. The composite oxide-containing layer 7 may be a layer made of the composite oxide according to the first embodiment.

In the active material composite material particle 4 shown in FIG. 2, the whole active material secondary particle 6 is covered with the composite oxide-containing layer 7. The active material composite material particle 4 may be in a state in which part of the composite oxide-containing layer 7 intrudes into the space between the active material primary particles 5 included in the active material secondary particle 6. In addition, the active material composite material particle 4 may be in a state in which the active material primary particles 5 are linked to one another through the composite oxide-containing layer 7.

<Production of Active Material Composite Material>

A method of producing an active material composite material will be described. Specifically, a method of forming a composite oxide-containing layer onto a surface of an active material particle is explained.

The composite oxide-containing layer may be formed onto the surface of the active material particle, by any process with which coating material can be attached to a powdered body. For instance, composite oxide nanoparticles to be a material for the composite oxide-containing layer may be synthesized, then mixed with an active material using a ball mill, or the like, to there by cover the active material surface with the composite oxide.

Nano particles of the composite oxide may be obtained by the synthesis process described in the first embodiment. Because the context is redundant, the synthesis details are omitted.

The composite oxide nanoparticles with an average particle size of, for instance, from 1 nm to 500 nm as obtained using a bead mill may be attached onto the particle surface of the active material by being mixed together with the active material particles in a ball mill. Instead, the nanoparticles may be used to prepare a polyvinyl alcohol-containing dispersion, and attached to the active material particle surface by using a spray dryer or a tumbling fluidized bed device.

Alternatively, as described below, while a battery may include an active material-containing layer and a solid electrolyte-containing layer, the composite oxide-containing layer may be disposed between these layers. In this case, the composite oxide-containing layer formed into a sheet may be sandwiched between the active material layer and the solid electrolyte layer. Details will be described later.

A second method of implementing a composite oxide-containing layer includes: preparing a precursor solution; coating a surface of an active material particle with the precursor solution for the composite oxide-containing layer then drying; and thereafter performing heat treatment to form the composite oxide-containing layer. Examples of the precursor solution for the composite oxide-containing layer, which may be used, include those in which starting materials for the composite oxide-containing layer are dissolved in a solvent such as alcohol. For instance, the precursor solution may be prepared by dissolving into ethanol, $LiOC_2H_5$, $Nb(OC_2H_5)_5$, $KOC_2H_5$, $Ta(OC_2H_5)_5$, $Fe(OC_2H_5)_3$, or the like.

The prepared precursor solution for the composite oxide-containing layer may be used to coat an assembly of active material. The active material may be coated with the precursor for the composite oxide-containing layer by any process in which active material powder is coated with a solution. The solution coating may be carried out using a tumbling fluidized bed coating device, for example.

Active material particles coated with the composite oxide-containing layer can be obtained by subjecting the active material powder coated with the precursor for the composite oxide-containing layer to heat treatment.

The heat treatment temperature may be set to a temperature at which densification of the composite oxide-containing layer can be promoted. When the heat treatment temperature is too high, the active material and the precursor for the composite oxide-containing layer readily react. Thus, 450° C. or lower is preferred, and 400° C. or lower is more preferred. To make the composite oxide-containing layer dense and to remove residual organic material, 250° C. or higher is preferred, and 300° C. or higher is more preferred.

<Measurement of Active Material Composite Material>

The active material and composite oxide included in the active material composite material can be measured by TEM-EDX measurement and ICP emission spectrometry as described in the first embodiment. In addition, the crystal structure of the oxide included in the active material particle can be examined by powder X-ray diffraction (powder XRD) measurement.

When the active material composite material to be measured is included in a battery, an active material-containing layer containing the subject active material composite material is collected from the battery in the same procedure as described previously.

The details of TEM-EDX and ICP overlap with those in the first embodiment, and description thereof is thus omitted. Like the distribution of various elements included in the composite oxide, the distribution of various elements included in the active material can be determined by mapping.

(Powder X-ray Diffraction Measurement)

Powder X-ray diffraction measurement of an active material can be performed, for example, as follows.

The pulverized sample is filled in a flat plate holder section having a depth of 0.2 mm formed on a glass sample plate. At this time, care should be taken to sufficiently fill the holder section with the sample. Precaution should also be taken to avoid cracking and gaps caused by insufficient filling of the sample. Then, another glass plate is used to smoothen the surface of the sample by sufficiently pressing the glass plate against the sample. Precaution should be taken to avoid too much or too little a filling amount, so as to prevent any rises and dents beyond the reference plane of the glass holder. Subsequently, the glass plate filled with the sample is set in a powder X-ray diffractometer, and X-ray diffraction (XRD) patterns are obtained using Cu-Kα rays.

Note that, there may be a case where the orientation of the sample becomes great depending on particle shape of the sample. In the case where there is high degree of orientation in the sample, there is the possibility of deviation of the peak position or variation in an intensity ratio, depending on how the sample is filled. Such a sample having significantly high orientation is measured using a glass capillary. Specifically, the sample is inserted into the capillary, which is then mounted on a rotary sample table and measured while being rotated. Such a measuring method can provide the result with the influence of orientation reduced. It is preferable to use a capillary formed of Lindeman glass having a diameter of 1 mm to 6 mm φ as the glass capillary.

As an apparatus for powder X-ray diffraction measurement, SmartLab manufactured by Rigaku is used, for example. Measurement is performed under the following conditions:

X-ray source: Cu target

Output: 45 kV, 200 mA soller slit: 5 degrees in both incident light and received light step width (2θ): 0.02 deg scan speed: 20 deg/min semiconductor detector: D/teX Ultra 250 sample plate holder: flat glass sample plate holder (0.5 mm thick)

measurement range: $5° \leq 2\theta \leq 90°$

When another apparatus is used, in order to obtain measurement results equivalent to those described above, measurement using a standard Si powder for powder X-ray diffraction is performed, and measurement is conducted with conditions adjusted such that a peak intensity and a peak top position correspond to those obtained using the above apparatus.

Conditions of the above powder X-ray diffraction measurement is desirably set, such that an XRD pattern applicable to Rietveld analysis is obtained. In order to collect data for Rietveld analysis, specifically, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

In a battery, the active material may be contained in an active material-containing layer. The active material containing-layer may also contain a solid electrolyte, an electro-conductive agent, a binder, and the like, aside from the active material. In addition, a current collector made of metal foil, for example, may be provided on the active material-containing layer. Therefore during measurement, peaks derived from the metal foil serving as current collector, the solid electrolyte, the electro-conductive agent, the binder, and the like are measured and grasped in advance using XRD. It is a matter of course that this operation can be omitted if such peaks have been grasped in advance.

As described below, the battery may contain a polymer electrolyte. When the battery contains a polymer electrolyte, it is desirable that the electrode body taken-out from the battery is washed with a solvent such as ethyl methyl carbonate.

The active material composite material according to the second embodiment includes an active material particle and a composite oxide-containing layer in contact with at least part of a surface of the active material particle. The composite oxide-containing layer contains the composite oxide according to the first embodiment. Accordingly, the active material composite material can realize a battery having low internal resistance and excellent high temperature storage performance.

Third Embodiment

According to a third embodiment, provided is an electrode including a composite oxide-containing layer and an active material-containing layer containing an active material. The composite oxide-containing layer is in contact with at least part of the active material. The composite oxide-containing layer contains the composite oxide according to the first embodiment.

The electrode according to the embodiment is, for instance, a battery electrode. The battery referred to herein encompasses a storage battery capable of storing electric power, for instance, and a specific example thereof is a secondary battery such as a lithium ion battery.

The active material included in the active material-containing layer may have a particulate-shaped form. The active material particles may be single primary particles, secondary particles that are primary particle agglomerates, or a mixture of the single primary particles and the secondary particles. Details of such particles and details of the active material particles described in the second embodiment overlap, and description thereof is thus omitted. The active material-containing layer may optionally contain an electro-conductive agent and a binder, in addition to the active material.

The active material-containing layer may further contain a solid electrolyte. Lithium ion conductivity within the active material-containing layer can be increased by inclusion of the solid electrolyte. Examples of the solid electrolyte that may be included in the active material-containing layer include at least one first sulfide solid electrolyte selected from the group consisting of $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$SiS_2$, $Li_3PO_4$—$Li_2S$—$SiS_2$, $Li_3PO_4$—$Li_2S$—$SiS$, $LiI$—$Li_2S$—$P_2O_5$, $LiI$—$Li_3PO_4$—$P_2S_5$, $Li_2S$—$P_2S_5$, $Li_2S$—$GeS_2$—$P_2S_5$, glass-ceramic materials represented by general formula $Li_{4-w}Ge_{1-w}P_wS_4$ where the subscript w is within a range of $0.7 \leq w \leq 1$, and halides having part of a composition of each material substituted by halogen. In addition, one or more other solid electrolytes such as an oxide-based amorphous solid electrolyte, a crystalline oxide, and a crystalline oxynitride may be combined with the first sulfide solid electrolyte. Examples of the other solid electrolytes include: oxide-based amorphous solid electrolytes such as $Li_2O$—$B_2O_3$—$P_2O_5$, $L_2O$—$SiO_2$, $Li_2O$—$B_2O_3$, $Li_2O$—$B_2O_3$—$ZnO$; crystalline oxides such as NASICON-type solid electrolytes (e.g., a compound represented by $Li_{1.3}Al_{0.3}Ti_{0.7}(PO_4)_3$, and compounds represented by $Li_{1+x+y}A_xTi_{2-x}Si_yP_{3-y}O_{12}$ where A is Al or Ga, $0 \leq x \leq 0.4$, and $0 < y \leq 0.6$), perovskite solid electrolytes (e.g., compounds represented by $[(B_{1/2}Li_{1/2})_{1-z}C_z]TiO_3$ where B is La, Pr, Nd, or Sm, C is Sr or Ba, and $0 \leq z \leq 0.5$), garnet-type solid electrolytes (e.g., $Li_7La_3Ta_2O_{12}$, $Li_7La_3Zr_2O_{12}$, and $Li_6BaLa_2Ta_2O_{12}$), LISICON-type solid electrolytes (e.g., $Li_{3.6}Si_{0.6}P_{0.4}O_4$); crystalline oxynitrides such as compounds represented by $Li_3PO_{(4-3/2w)}N_W$ where $W<1$; and other solid electrolyte materials such as $LiI$, $LiI$—$Al_2O_3$, $Li_3N$, and $Li_3N$—$LiI$—$LiOH$.

The content of the solid electrolyte in the active material-containing layer may amount, for instance, from 5 mass % to 60 mass % with respect to the active material. When the solid electrolyte is included at such an amount in the active material-containing layer, favorable lithium ion conductivity can be obtained while the energy density of the active material-containing layer is kept.

At least part of the active material can be coated with the composite oxide-containing layer. For instance, at least part of the particle surface of the particulate active material may be coated with the composite oxide. It is desirable that the entire surface of the active material particle (primary particle or secondary particle) is coated with the composite oxide-containing layer. The composite oxide-containing layer may be included in the active material-containing layer in a state of covering a surface of active material particles. The active material-containing layer may contain the active material composite material according to the second embodiment.

Alternatively, the composite oxide-containing layer may be provided on at least one surface of the active material-containing layer. As described below, the battery may include an active material-containing layer and a layer that contains solid electrolyte. Among surfaces of the active material-containing layer, a surface facing the layer of solid electrolyte is desirably provided with the composite oxide-containing layer.

As described above, the composite oxide-containing layer can function as a reaction-suppression layer by which an interface reaction between the active material surface and the solid electrolyte is suppressed. It is desirable to have a configuration where the composite oxide-containing layer is interposed between the active material surface and the solid electrolyte. For instance, when the above first sulfide-based solid electrolyte is included in the active material-containing layer, the surface of the active material particles may be coated with the composite oxide-containing layer, whereby direct contact between the active material surface and the sulfide solid electrolyte can be avoided, thereby suppressing the interface reaction.

By interposing the composite oxide-containing layer between the sulfide-based solid electrolyte and the active material, internal resistance can be reduced. To further lower the internal resistance, an organic electrolyte may be included. The organic electrolyte may contain a liquid nonaqueous electrolyte, or a solid polymer electrolyte and/or a gel polymer electrolyte. The organic electrolyte containing a solid polymer electrolyte and/or a gel polymer electrolyte can be referred to as an organic polymer-containing electrolyte. The organic electrolyte may be impregnated into the active material-containing layer.

The solid polymer electrolyte and the gel polymer electrolyte may be, for instance, a composite of a liquid nonaqueous electrolyte and a binder. Because of this, the solid polymer electrolyte and the gel polymer electrolyte may contain a nonaqueous electrolytic liquid component and a monomer component, which compose the composite.

The liquid nonaqueous electrolyte may include an organic solvent, and an electrolyte salt (Li supporting salt) dissolved in the organic solvent and including Li. The concentration of electrolyte salt is preferably within a range of from 0.5 mol/L to 2.5 mol/L.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent. The organic solvent preferably includes at least one selected from the group consisting of propylene carbonate (PC), ethylene carbonate (EC), diethyl carbonate (DEC), and methyl ethyl carbonate (MEC).

Examples of the electrolyte salt (Li supporting salt) include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the binder include polymer materials that become gelled with a carbonate compound. Specific examples include polyacrylonitrile (PAN), polyethylene oxide (PEO), polyvinylidene fluoride (PVdF), and polymethyl methacrylate. One of the above binder may be used singly, or two or more thereof may be mixed and used. It is preferable for the binder content, in the case of PVdF for instance, to be less than 20 mass % with respect to the mass of the composite electrolyte (organic polymer-containing electrolyte).

The solid polymer electrolyte and the gel polymer electrolyte differ with respect of hardness or viscosity of polymer. The solid polymer has a high polymerization degree and a high hardness, and therefore does not have fluidity. The gel polymer electrolyte has a lower hardness than the solid polymer, and includes those having fluidity (viscosity).

Examples of a polymerization initiator that can be used include a benzene sulfonate or an alkyl sulfonium salt. The amount of the polymerization initiator may be appropriately varied depending on the composition and amount of a liquid nonaqueous electrolyte or binder.

The electrode according to the third embodiment may further include a current collector. The active material-containing layer may be provided on one side or both sides of the current collector.

As the current collector, a foil including Al (aluminum) is preferably used. As such an Al-containing foil, it is preferred to use an aluminum foil of pure Al (purity of 100%) or an aluminum alloy foil in which an aluminum purity is 99% or more and less than 100%. Examples of Al alloy foil include an aluminum alloy foil containing at least one selected from the group consisting of Mg, Ti, Zn, Ni, Cr, Mn, Fe, Cu, and Si. Preferable as the Al alloy is an alloy including at least one selected from the group consisting of Fe, Mg, Zn, Mn, and Si in addition to Al. For example, an Al—Fe alloy, an Al—Mn-based alloy, and an Al—Mg-based alloy are able to obtain higher strength than that of Al. On the other hand, a content of transition metals such as Cu, Ni, Cr, and the like in the Al and Al alloys is preferably 100 ppm or less (including 0 ppm). For example, an Al—Cu-based alloy has increased strength, but deteriorated corrosion resistance, and is therefore not suitable as the current collector. A thickness of the aluminum foil or aluminum alloy foil is preferably 5 μm to 20 μm, and more preferably less than 15 μm.

The electrode may be a positive electrode. The positive electrode may include a positive electrode active material, as battery active material. The positive electrode may include a positive electrode active material-containing layer containing the positive electrode active material, as an active material-containing layer. Explanation regarding the positive electrode active material are omitted, since details thereof are the same as those of the active material explained in the second embodiment.

The electrode may have a bipolar electrode structure described later. Explanations thereof are omitted, since the explanations are the same as those described later.

<Manufacture of Electrode>

The electrode may be manufactured by, for instance, the following method. First, the composite oxide is attached to or coated onto the surface of the active material particle by the procedure described in the second embodiment. The resulting active material composite material is used as an electrode mixture and this electrode mixture is subjected to molding so as to have a desired electrode shape. As such, an active material-containing layer is obtained. In this manner, the electrode can be manufactured. The electrode mixture may be a mixture of the active material composite material and any electrode material such as the first sulfide solid electrolyte.

Alternatively, the electrode may be manufactured by the following method. First, in a same manner as the above method, the active material composite material is obtained. The active material composite material and optional electrode materials, such as electro-conductive agent, binder, and solid electrolyte are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be produced in this manner.

Other than that, the electrode may also be manufactured by the following method. First, in the same manner as the above methods, the active material composite material is obtained. The active material composite material and optional electrode materials, such as electro-conductive agent, binder, and solid electrolyte are mixed to obtain an active material mixture. Next, the active material mixture is formed into pellets. Then the electrode can be obtained by arranging the pellets on the current collector.

When a sheet-shaped composite oxide-containing layer is used, a separately produced sheet containing the composite oxide is disposed on the active material-containing layer. The sheet-shaped composite oxide-containing layer may be molded, for instance, as follows. First, a composite oxide is dispersed in a solvent to prepare a dispersion. A binder is added thereto to prepare a suspension. This suspension is coated onto, for instance, a glass substrate. The resulting coating film is then dried. The dried sheet-shaped composite oxide-containing layer is peeled from the substrate and disposed on an active material-containing layer or active material mixture pellet(s). After that, a stacked layer including the composite oxide-containing layer, the active material-containing layer or pellet(s), and, optionally a current collector, is pressed. If the sheet-shaped composite oxide-containing layer is used, it is possible to skip a step of directly attaching the composite oxide-containing layer to the active material particle in the above-described various methods, so that solitary active materials may be used instead of the active material composite material.

<Measurement of Electrode Material>

The active material and composite oxide included in the active material-containing layer of the electrode, as well as the optionally included first sulfide solid electrolyte and other solid electrolyte, may be examined by the TEM-EDX measurement and ICP emission spectrometry described in the first embodiment and the powder X-ray diffraction measurement described in the second embodiment.

When an electrode to be measured is included in a battery, the subject electrode or the corresponding active material-containing layer is collected from the battery, for instance, by the same procedure as described previously.

The details of each of TEM-EDX, ICP, and XRD measurements overlap with those in the first embodiment and the second embodiment. Thus, description thereof is omitted. Like the distribution of various elements included in the composite oxide and/or the active material, the distribution of various elements included in the solid electrolyte can be determined by mapping. In addition, like the active material, the crystal structure of the oxide included in the solid electrolyte can be examined by XRD measurement.

The electrode according to the third embodiment includes an active material-containing layer containing an active material, and a composite oxide-containing layer in contact with at least a portion of a surface of the active material. The composite oxide-containing layer contains the composite oxide according to the first embodiment. Accordingly, the electrode can realize a battery having low internal resistance and excellent high temperature storage performance.

Fourth Embodiment

According to a fourth embodiment, provided is a battery including a positive electrode active material-containing layer, a negative electrode active material-containing layer, an electrically-insulating layer, and a composite oxide-containing layer. The positive electrode active material-containing layer contains a positive electrode active material. The negative electrode active material-containing layer contains a negative electrode active material. The electrically-insulating layer contains a second sulfide solid electrolyte, and is disposed between the positive electrode active material-containing layer and the negative electrode active material-containing layer. The composite oxide-containing layer is in contact with at least part of the positive electrode active material. The composite oxide-containing layer contains the composite oxide according to the first embodiment.

The battery according to the embodiment may be, for instance, a storage battery capable of storing electric power, and a specific example thereof is a secondary battery such as a lithium ion battery.

The battery according to the fourth embodiment may further include a current collector. The positive electrode active material-containing layer may be disposed on a current collector to configure a positive electrode. The negative electrode active material-containing layer may be disposed on a current collector to configure a negative electrode. Alternatively, the positive electrode active material-containing layer may be disposed on one surface of a current collector, and the negative electrode active material-containing layer may be disposed on a reverse surface of the current collector to configure an electrode having a bipolar structure.

The positive electrode active material and the negative electrode active material may respectively be capable of lithium ion insertion/extraction. As the positive electrode active material, the active materials described in the second embodiment may be used, for example. Details of the positive electrode active materials and details of the active materials described in the second embodiment overlap, and description thereof is thus omitted. The negative electrode active materials will be described later.

The electrically-insulating layer includes the second sulfide solid electrolyte, and for instance, may be an electrolyte layer interposed between the positive electrode active material-containing layer and the negative electrode active material-containing layer. The second sulfide solid electrolyte includes a solid electrolyte material similar to that of the first sulfide solid electrolyte described in the third embodiment. The electrically-insulating layer serves to electrically insulate the positive electrode active material-containing layer from the negative electrode active material-containing layer. The electrically-insulating layer can conduct lithium ions. That is, the electrically-insulating layer may be a Li conductive layer.

The composite oxide-containing layer may be in contact with the positive electrode active material in substantially the same fashion as that of the composite oxide-containing layer in the electrode according to the third embodiment. Thus, at least part of the positive electrode active material may be coated with the composite oxide-containing layer. For instance, at least part of the particle surface of particulate positive electrode active material (of primary particles or of secondary particles) may be coated with the composite oxide. The details of coating with the composite oxide-containing layer and those in the third embodiment overlap, and description thereof is thus omitted. The positive electrode active material-containing layer may contain the active material composite material according to the second embodiment. Of course, the composite oxide-containing layer may be provided on at least one surface of the positive electrode active material-containing layer. As described below, the positive electrode active material-containing layer may include a surface facing the electrically-insulating layer. Among surfaces of the positive electrode active material-containing layer, a surface facing the electrically-insulating layer is desirably provided with the composite oxide-containing layer. That is, the composite oxide-containing layer may be provided in such a manner that the composite oxide-containing layer is positioned between the positive electrode active material-containing layer and the electrically-insulating layer.

The battery according to the embodiment includes a container member. The positive electrode, the negative electrode, and the electrolyte are housed in the container member. When a nonaqueous electrolyte is used together depending on the application, the nonaqueous electrolyte is also included in the container member. Further, a bipolar structure may be adopted as an electrode structure.

Figure 3:
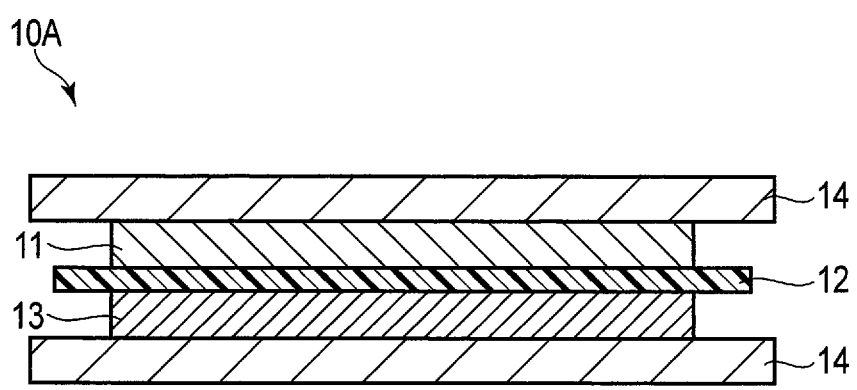
FIG. 3 is a schematic cross-sectional diagram showing an example of an electrode body according to an embodiment.

An example of an electrode battery that may be included in the battery according to the embodiment is shown in FIG. 3. FIG. 3 shows an example of an electrode body according to the embodiment. The electrode body 10A shown in FIG. 3 includes a positive electrode active material-containing layer 11, an electrically-insulating layer 12, a negative electrode active material-containing layer 13, and current collectors 14. As depicted, the electrode body 10A has a structure in which these members are stacked such that the electrically-insulating layer 12 is interposed between the positive electrode active material-containing layer 11 and the negative electrode active material-containing layer 13, and the current collectors 14 are arranged at both ends. The electrode body 10A shown in FIG. 3 is a single stack electrode body in which one set of the above described structures is stacked.

In addition, in the positive electrode active material-containing layer 11 of the electrode body 10A shown in FIG. 3, the composite oxide-containing layer is provided on the surface of the positive electrode active material included in the positive electrode active material-containing layer 11, for instance, in a manner of covering the surface of the positive electrode active material particles. The composite oxide-containing layer is not depicted because the composite oxide-containing layer is dispersed inside the positive electrode active material-containing layer 11, along with the positive electrode active material.

Figure 4:
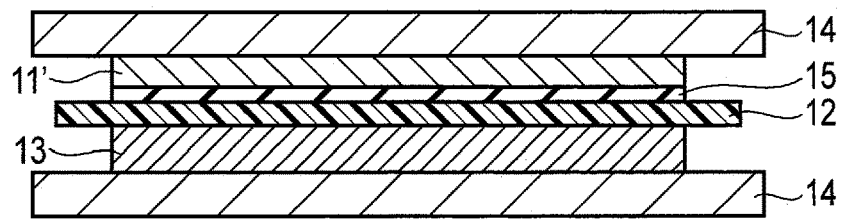
FIG. 4 is a schematic cross-sectional diagram showing another example of an electrode body according to an embodiment.

FIG. 4 is a schematic cross-sectional diagram illustrating another example of an electrode body according to an embodiment. In the electrode body 10A' shown in FIG. 4, a composite oxide-containing layer 15 having a sheet shape, for instance, is provided between the positive electrode active material-containing layer 11' and the electrically-insulating layer 12. The positive electrode active material-containing layer 11' does not include any composite oxide, therein. Except for these points, the electrode body 10A' in FIG. 4 is a single layered electrode body like the electrode body 10 in FIG. 3.

Both the electrode body 10A shown in FIG. 3 and the electrode body 10A' shown in FIG. 4 contain the current collectors 14; however, in a battery using the single layered electrode body, current collectors may be omitted. When the current collectors are omitted, the positive electrode active material-containing layer and the negative electrode active material-containing layer may each be electrically connected, to an electrode terminal via another member, such as an electrode lead.

Figure 5:
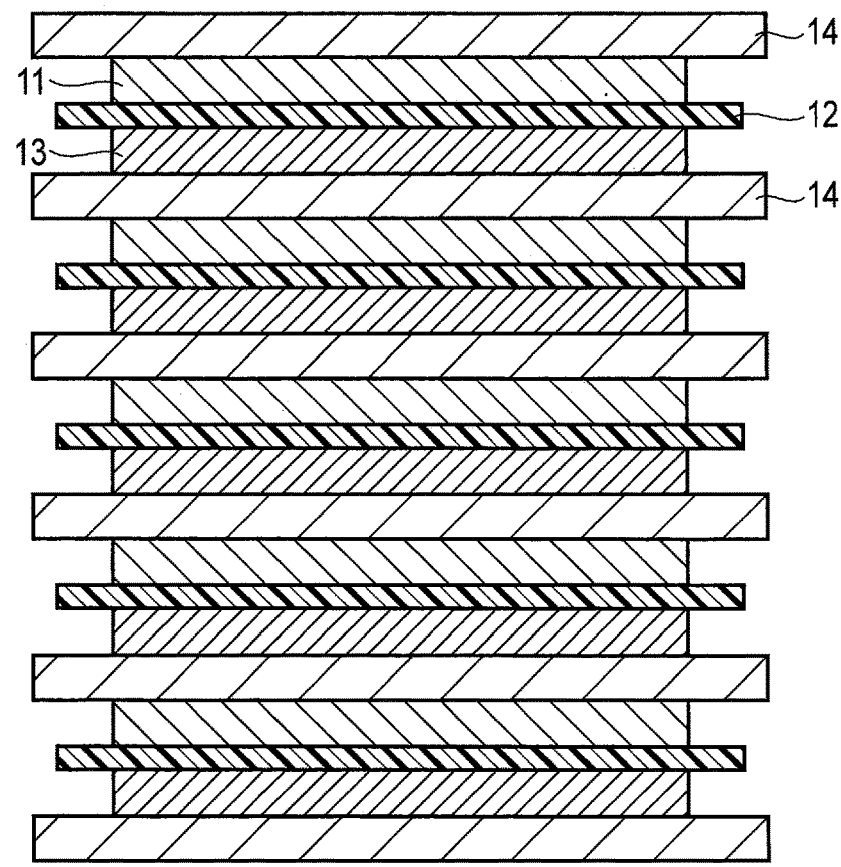
FIG. 5 is a schematic cross-sectional diagram showing an example of an electrode body having a bipolar electrode structure according to the embodiment.

As an example of another aspect of a battery according to the embodiment, an electrode body 10B having a bipolar electrode structure as shown in FIG. 5 may be configured and included in the battery. FIG. 5 is a schematic cross-sectional diagram showing an example of an electrode body having a bipolar electrode structure according to the embodiment. There may be stacked two or more sets of a structure set, in each of which the current collector 14, the negative electrode active material-containing layer 13, the electrically-insulating layer 12, and the positive electrode active material-containing layer 11 are stacked in this order, and another current collector 14 may be stacked on one side of the positive electrode active material-containing layer 11 at the end (top of the drawing), as shown in FIG. 5. In other words, the electrode body 10B may include plural stacks and the current collectors 14, each of the stacks including the positive electrode active material-containing layer 11, the electrically-insulating layer 12, and the negative electrode active material-containing layer 13 which are sequentially stacked, and the electrode body 10B may thus have a bipolar electrode structure in which the current collectors 14 are arranged between the positive electrode active material-containing layer 11 of one stack and the negative electrode active material-containing layer 13 of another stack. The number of sets of stacking this structure may be appropriately selected depending on design of shape and size of the battery. In the depicted example, five sets are stacked. In the electrode body 10B according to the present embodiment, the positive electrode active material-containing layer 11, the electrically-insulating layer 12, and the negative electrode active material-containing layer 13 can be adhered snugly to be thin. Therefore, a thin battery requiring small space and having large capacity and excellent electrochemical stability can be obtained by stacking many of the stacked structures. Note that, like the electrode body 10A' in FIG. 4, in the electrode body 10B having a bipolar structure, the composite oxide-containing layer 15 may be arranged between each positive electrode active material-containing layer 11 and the corresponding electrically-insulating layer 12. As a matter of course, when the sheet-shaped composite oxide-containing layer 15 is used, the composite oxide-containing layer may be omitted from the inside of the positive electrode active material-containing layer 11, and the positive electrode active material-containing layer 11' similar to that in the electrode body 10A' may be provided.

Figure 6:
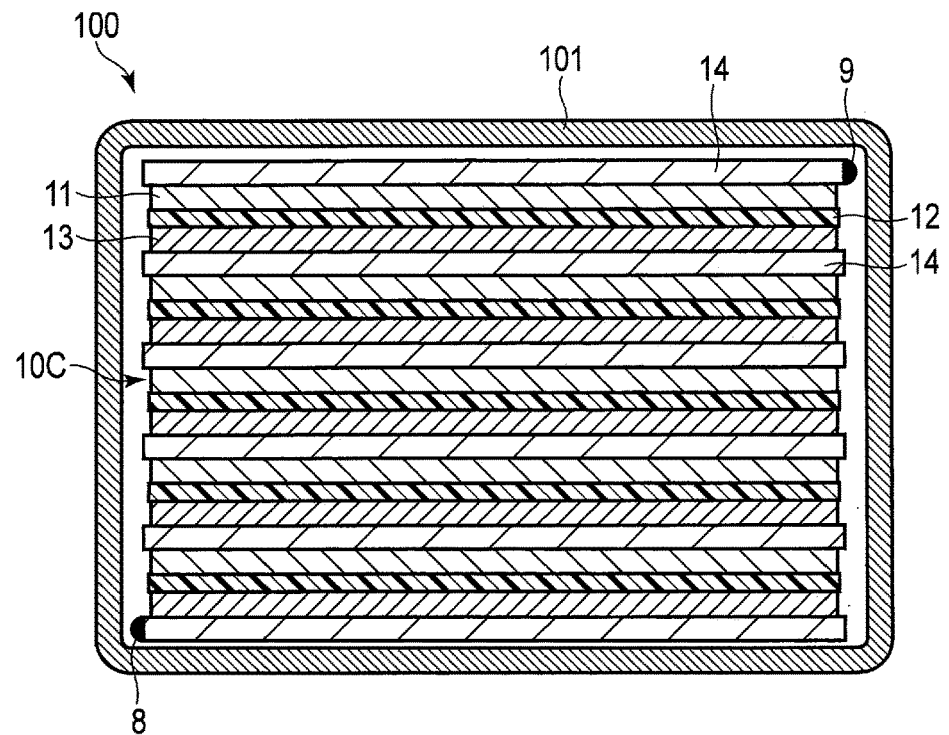
FIG. 6 is a schematic cross-sectional diagram showing an example of a battery according to an embodiment.

FIG. 6 is a schematic cross-sectional diagram of an example of the battery according to the embodiment.

As shown in FIG. 6, the battery 100 includes a bipolar electrode body 10C housed in a container member 101. The depicted electrode body 10C has a structure in which there are stacked two or more sets of a structure set, in which the current collector 14, the negative electrode active material-containing layer 13, the electrically-insulating layer 12, and the positive electrode active material-containing layer 11 are stacked in this order from the bottom, and a current collector 14 is stacked on one side of the positive electrode active material-containing layer 11 at the top, similar to the electrode body 10B shown in FIG. 5. A positive electrode terminal 9 is electrically connected to the current collector 14 adjacent to the positive electrode active material-containing layer 11 at one furthest end (top of drawing). A negative electrode terminal 8 is electrically connected to the current collector 14 adjacent to the negative electrode active material-containing layer 13 at another furthest end (bottom of drawing). The positive electrode terminal 9 and the negative electrode terminal 8 extend to the outside of the container member 101.

For the battery 100 shown FIG. 6, an example has been depicted in which the electrode body 10C includes five sets of stacked structures in which the current collector 14, the negative electrode active material-containing layer 13, the electrically-insulating layer 12, and the positive electrode layer 11 are stacked, in the same manner as the electrode body 10B of FIG. 5. However, the number of sets of the stacked structures included in the electrode body 10C may be, for example, one set as with the electrode body 10A of FIG. 3, or may alternatively be two or more sets. In addition, like the electrode body 10A' in FIG. 4, the composite oxide-containing layer 15 may be arranged between each positive electrode active material-containing layer 11 and corresponding electrically-insulating layer 12. In this case, the composite oxide-containing layer may be omitted from inside the positive electrode active material-containing layer 11.

Hereinafter, the composite oxide-containing layer, the positive electrode active material-containing layer, the electrically-insulating layer, the negative electrode active material-containing layer, and the container member will be described in detail.

1) Composite Oxide-Containing Layer

The composite oxide-containing layer can function as a reaction-suppression layer by which an interface reaction between the positive electrode active material surface and the solid electrolyte, such as the second sulfide solid electrolyte included in the electrically-insulating layer, is suppressed. In a desirable configuration, the composite oxide-containing layer is interposed between the active material surface and the solid electrolyte. For instance, the positive electrode active material-containing layer may contain a solid electrolyte, as described below. When the positive electrode active material-containing layer contains the above first sulfide-based solid electrolyte, the surface of the positive electrode active material particle may be coated with the composite oxide-containing layer, thereby avoiding direct contact between the active material surface and the sulfide solid electrolyte, which in turn suppresses interface reaction. Alternatively, like the sheet-shaped composite oxide-containing layer 15 shown in FIG. 4, the composite oxide-containing layer may be interposed between the positive electrode active material-containing layer 11 and the electrically-insulating layer 12 so as to separate the former from the latter.

In addition, the composite oxide-containing layer may be included in a battery in substantially the same form as that of the composite oxide-containing layer in the active material composite material according to the second embodiment or of the composite oxide-containing layer in the electrode according to the third embodiment. The details overlap, and description thereof is thus omitted.

2) Positive Electrode Active Material-Containing Layer

The positive electrode active material-containing layer 11 is supported on one side of the current collector 14, in the example of the single stack electrode body 10A shown in FIG. 3. The positive electrode active material-containing layer 11 (or positive electrode active material-containing 11') includes a positive electrode active material, and may optionally include an electrolyte, an electro-conductive agent, and a binder.

As the current collector for supporting the positive electrode active material-containing layer on a surface thereof, the foil including aluminum (Al) described in the third embodiment is preferably used. A more preferable Al purity for the current collector onto which the positive electrode active material-containing layer is supported, is in a range of 99.0% to 99.99%. Within this range, deterioration of high-temperature cycle life due to dissolution of impurity elements can be alleviated.

Details of the positive electrode active material that can be included in the positive electrode active material-containing layer and details of the active materials described in the second embodiment overlap, and description thereof is thus omitted.

The electrolyte that may be included in the positive electrode active material-containing layer may be the first sulfide solid electrolyte, other solid electrolytes, and/or organic electrolytes, described in the third embodiment. When the positive electrode active material-containing layer contains the first sulfide solid electrolyte, this first sulfide solid electrolyte may be the same as or may be different from the second sulfide solid electrolyte included in the electrically-insulating layer. The positive electrode active material-containing layer may contain the solid electrolyte in a content similar to that of the active material-containing layer described in the third embodiment.

The electro-conductive agent is added to increase electron conductivity within the positive electrode active material-containing layer and to suppress contact resistance between the positive electrode active material-containing layer and the current collector. The electro-conductive agent may include, for example, vapor grown carbon fiber (VGCF), acetylene black, carbon black, graphite, and the like. One of these may be used as electro-conductive agent, or alternatively, two or more may be used in combination as electro-conductive agent.

The binder may be mixed-in to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxymethyl cellulose (CMC), and salts of CMC. One of these may be used as the binder, or alternatively, two or more may be used in combination as the binder.

In a positive electrode active material-containing layer that contains an electro-conductive agent and a binder, regarding a mixing ratio of the positive electrode active material, the electro-conductive agent, and the binder, the positive electrode active material is preferably in a range of from 80% by mass to 95% by mass, the electro-conductive agent is preferably in a range of from 3% by mass to 18% by mass, and the binder is preferably in a range of from 2% by mass to 7% by mass. When a content of electro-conductive agent is 3% or more by mass, the above-described effect can be exhibited. When a content of electro-conductive agent is 18% or less by mass, in the case that a nonaqueous electrolyte is included, decomposition of the nonaqueous electrolyte on the electro-conductive agent surface during storage under high temperature can be reduced. When a content of binder is 2% or more by mass, sufficient electrode strength can be obtained. Note, that the binder may serve as an insulator. Thus, when the content of binder is kept to 7% or less by mass, the amount of insulator within the electrode is reduced, whereby internal resistance can be reduced.

The positive electrode active material-containing layer can be produced, for example, by the same method as for the electrode according to the third embodiment.

3) Electrically-Insulating Layer

The electrically-insulating layer is positioned between the positive electrode active material-containing layer and the negative electrode active material-containing layer. As shown in FIG. 3, the electrically-insulating layer 12 may be in contact with both the positive electrode active material-containing layer 11 and the negative electrode active material-containing layer 13. Alternatively, the electrically-insulating layer 12 may be in contact with the composite oxide-containing layer 15 provided on the positive electrode active material-containing layer 11', as show in FIG. 4.

The electrically-insulating layer contains the second sulfide solid electrolyte. The second sulfide solid electrolyte includes a solid electrolyte material similar to the first sulfide solid electrolyte described in the third embodiment. Specifically, the electrically-insulating layer includes at least one second sulfide solid electrolyte selected from the group consisting of $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$SiS_2$, $Li_3PO_4$—$Li_2S$—$SiS_2$, $Li_3PO_4$—$Li_2S$—$SiS$, $LiI$—$Li_2S$—$P_2O_5$, $LiI$—$Li_3PO_4$—$P_2S_5$, $Li_2S$—$P_2S_5$, $Li_2S$—$GeS_2$—$P_2S_5$, glass-ceramic materials represented by general formula $Li_{4-w}Ge_{1-w}P_wS_4$ where subscript w is within a range of $0.7 \leq w \leq 1$, and halides having part of a composition of each material substituted by a halogen.

The electrically-insulating layer may contain the second sulfide solid electrolyte in combination with an additional electrolyte other than the second sulfide solid electrolyte. The electrically-insulating layer may contain, as the additional electrolyte, at least one of the organic electrolyte or solid electrolyte other than the first sulfide solid electrolyte that has been described in the third embodiment.

While it is possible to decrease interface resistance by having the composite oxide-containing layer be interposed between the sulfide-based solid electrolyte and active material, inclusion of the organic electrolyte in the battery can further decrease the internal resistance. The organic electrolyte, like the organic electrolyte described in the third embodiment, may include a liquid nonaqueous electrolyte, or a solid polymer electrolyte and/or a gel polymer electrolyte. The organic electrolyte may be impregnated in at least one of the electrically-insulating layer, the positive electrode active material-containing layer, or the negative electrode active material-containing layer. From the viewpoint of decreasing the internal resistance, all of the electrically-insulating layer, positive electrode active material-containing layer, and negative electrode active material-containing layer preferably contain the organic electrolyte(s). Details of the organic electrolyte overlap with those in the third embodiment, and description thereof is thus omitted.

4) Negative Electrode Active Material-Containing Layer

The negative electrode active material-containing layer 13 is supported on one side of the current collector 14, in the example of the single stack electrode body 10A shown in FIG. 3. The negative electrode active material-containing layer 13 includes a negative electrode active material, and may optionally include an electrolyte, an electro-conductive agent, and a binder.

It is preferred to use a foil including Al (aluminum) as the current collector for supporting the negative electrode active material-containing layer on a surface thereof. As such Al-containing foil, Al foil or Al alloy foil is preferred. In particular, it is preferable to use aluminum foil of pure Al (purity of 100%) or aluminum alloy foil in which an aluminum purity is 98% or more and less than 100%. A more preferable Al purity for use in the current collector is within a range of 98% to 99.95%. The purity of the aluminum foil is even more preferably 99.99% or more. Examples of the Al alloy foil include an aluminum alloy foil including at least one element selected from the group consisting of Mg, Ti, Zn, Ni, Cr, Mn, Fe, Cu, and Si. As the Al alloy, an alloy including at least one selected from the group consisting of Fe, Mg, Zn, Mn and Si, in addition to Al is preferred. For example, an Al—Fe alloy, an Al—Mn-based alloy, and an Al—Mg-based alloy are able to obtain higher strength than that of Al. On the other hand, a content of transition metals such as Cu, Ni, Cr, and the like, in the Al and Al alloys is preferably 100 ppm or less (including 0 ppm). For instance, an Al—Cu-based alloy has increased strength but deteriorated corrosion resistance, and is therefore not suitable as current collector. The thickness of the aluminum foil and the aluminum alloy foil is preferably 5 μm to 20 μm, and more preferably 15 μm or less.

Examples of the negative electrode active material that can have Li inserted and extracted may include a carbon material, a graphite material, a Li alloy material, a metal oxide, and a metal sulfide. Of the materials including metal, those containing Ti element are preferred. Among them, it is preferable to select titanium-containing oxides having a potential at which Li ions are inserted and extracted that is within a range of from 1 V to 3 V (vs. $Li/Li^+$) based on a redox potential of lithium.

Examples of titanium-containing oxides include lithium titanate having a ramsdellite structure (e.g., $Li_{2+y}Ti_3O_7$, $0 \leq y \leq 3$), lithium titanate having a spinel structure (e.g., $Li_{4+x}Ti_5O_{12}$, $0 \leq x \leq 3$), monoclinic titanium dioxide ($TiO_2$), anatase titanium dioxide, rutile titanium dioxide, a hollandite titanium composite oxide, an orthorhombic titanium composite oxide, and a monoclinic niobium-titanium composite oxide.

Examples of the orthorhombic titanium-containing composite oxide include a compound represented by $Li_{2+a}M\alpha_{2-b}Ti_{6-c}M\beta_dO_{14+\sigma}$. Here, Mα is at least one selected from the group consisting of Sr, Ba, Ca, Mg, Na, Cs, Rb and K. Mβ is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

Examples of the monoclinic niobium titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0 \leq x \leq 5$, $0 \leq y < 1$, $0 \leq z < 2$, and $-0.3 \leq \delta \leq 0.3$. Specific examples of the monoclinic niobium titanium composite oxide include $Li_xNb_2TiO_7$ ($0 \leq x \leq 5$).

Another example of the monoclinic niobium titanium composite oxide is a compound represented by $Li_xTi_{1-y}M3_{y+z}Nb_{2-z}O_{7-\delta}$. Here, M3 is at least one selected from the group consisting of Mg, Fe, Ni, Co, W, Ta, and Mo. The respective subscripts in the composition formula are specified as follows: $0 \leq x < 5$, $0 \leq y < 1$, $0 \leq z < 2$, and $-0.3 \leq \delta \leq 0.3$.

One among these may be used alone, or alternatively, two or more may be mixed and used. More preferred is the spinel structured lithium-titanium oxide represented by General Formula $Li_{4+x}Ti_5O_{12}$ (x is $0 \leq x \leq 3$, more preferably $-1 \leq x \leq 3$), for which volume change is extremely small. By using such titanium-containing oxides, the Al foil can be used in the same manner as a positive electrode current collector in place of conventional copper foils, as a current collector for supporting the negative electrode active material-containing layer. As a result, light weight and cost reduction of the battery can be realized. Moreover, this is advantageous in view of weight and capacity per size for the battery having the later described bipolar electrode structure.

For particles of the negative electrode active material, it is desirable for an average particle diameter of primary particles to be 1 μm or less, while simultaneously, a specific surface area measured according to the BET method by $N_2$ adsorption is from 3 $m^2/g$ to 200 $m^2/g$. Accordingly, when the organic electrolyte is used in the battery, affinity between the negative electrode active material-containing layer and the organic electrolyte can be increased. In addition, by setting the average particle diameter of the primary particle to 1 μm or less, a diffusion distance of Li ions within the active material can be shortened. Further, the specific surface area can be increased. A method for measuring the specific surface area by the BET method is described later. A more preferred average particle diameter is from 0.1 μm to 0.8 μm.

The negative electrode active material particles may include secondary particles in addition to the above-described primary particles. The average particle size (diameter) of the secondary particles of the negative electrode active material is preferably larger than 2 μm. The secondary particle diameter of the negative electrode active material is more preferably larger than 5 μm. The secondary particle diameter is most preferably from 7 μm to 20 μm. Further, the secondary particles and the primary particles of negative electrode active material may be mixed within the negative electrode active material-containing layer. In view of higher densification, it is preferred that the primary particles are present in an amount of from 5% by volume to 50% by volume within the negative electrode active material-containing layer.

The electrolyte that may be included in the negative electrode active material-containing layer may be the first sulfide solid electrolyte, other solid electrolyte, and/or organic electrolyte, described in the third embodiment. The electrolyte included in the negative electrode active material-containing layer may be the same as or different from one or both of the electrolyte included in the electrically-insulating layer and the electrolyte included in the positive electrode active material-containing layer. The negative electrode active material-containing layer may contain the solid electrolyte in a content similar as that for the active material-containing layer described in the third embodiment.

The electro-conductive agent may be mixed-in to increase current collecting performance and also to suppress contact resistance between the negative electrode active material and the current collector. As the electro-conductive agent, for example, a carbon material may be used. Examples of the carbon material include vapor grown carbon fiber (VGCF), acetylene black, carbon black, cokes, carbon fiber, graphite, Al powder, TiO, and the like. More preferably, a powder of the cokes, graphite, and TiO having an average particle diameter of 10 μm or less, or the carbon fiber having an average fiber diameter of 1 μm or less, in which a heat treatment temperature is from 800° C. to 2000° C., is preferred. With regard to these carbon materials, the specific surface area measured according to a BET method by $N_2$ adsorption is preferably 10 $m^2/g$ or more. One of these may be used as electro-conductive agent, or alternatively, two or more may be used in combination as electro-conductive agent. Alternatively, instead of using an electro-conductive agent, a carbon coating or an electro-conductive inorganic material coating may be applied to the surface of the active material particle.

The binder may be mixed-in to fill gaps among the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), salts of CMC, core-shell binders, and the like. One of these may be used as the binder, or alternatively, two or more may be used in combination as the binder.

In a negative electrode active material-containing layer including an electro-conductive agent and a binder, regarding a mixing ratio of the negative electrode active material, the electro-conductive agent, and the binder, the negative electrode active material is preferably in a range of from 80% by mass to 95% by mass, the electro-conductive agent is preferably in a range of from 3% by mass to 18% by mass, and the binder is preferably in a range of from 2% by mass to 7% by mass.

The negative electrode active material-containing layer may be produced through, for instance, a method similar to that for the electrode according to the third embodiment. In this regard, however, formation of the composite oxide-containing layer and formation the active material composite material are omitted. For instance, a negative electrode mixture containing a negative electrode active material is prepared without using the composite oxide. The negative electrode mixture may contain a solid electrolyte in addition to the negative electrode active material.

The negative electrode active material-containing layer may be produced by, for instance, the following method. First, a negative electrode mixture containing a negative electrode active material is prepared. The negative electrode mixture may be a powdered body containing a negative electrode active material alone. Alternatively, the negative electrode mixture may be a mixture of the negative electrode active material and any electrode material such as the first sulfide solid electrolyte. The negative electrode mixture may be molded into a desired electrode shape to yield a negative electrode active material-containing layer.

Alternatively, the negative electrode active material-containing layer may be produced by the following method. A negative electrode active material and any electrode materials such as an electro-conductive agent, a binder, and a solid electrolyte are suspended in a solvent to prepare a slurry. This slurry is coated onto one or both sides of a current collector. Next, the applied slurry is dried to obtain a stack including an active material-containing layer and the current collector. Then, this stack is pressed. In this way, a negative electrode having the negative electrode active material-containing layer formed on the current collector can be produced.

In addition, the negative electrode active material-containing layer may be produced by the following method. First, a negative electrode active material and any electrode materials such as an electro-conductive agent, a binder, and a solid electrolyte are mixed to yield a negative electrode mixture. Next, this negative electrode mixture is molded into a pellet form. The resulting pellet can be used as a negative electrode active material. For instance, each pellet is disposed on a current collector to obtain a negative electrode.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. Purity of the aluminum foil is preferably 99.5% or more. The laminate film may be formed into the shape of a container member by heat-sealing.

The wall thickness of the metal container is, for example, 1 mm or less, more preferably 0.5 mm or less, even more preferably 0.3 mm or less, and still more preferably 0.2 mm or less.

The metal case is made, for example, of aluminum, an aluminum alloy, iron, stainless steel, and the like. The aluminum alloy preferably contains elements such as magnesium, zinc, or silicon. If the aluminum alloy contains a transition metal such as iron, copper, nickel, or chromium, the content thereof is preferably 100 ppm by mass or less.

When a metal can made of aluminum alloy is used as the container member, the metal can is preferably made of an alloy having 99.8% or less of Al purity and including at least one selected from the group consisting of Mn, Mg, Zn, and Si. By using the aluminum alloy, strength of the metal can is drastically increased, whereby, it becomes possible to make the wall thickness of the can thin. As a result, it is possible to realize a thin, lightweight, high-output battery with excellent heat dissipation.

The shape of the container member is not particularly limited. The shape of the container member may be, for example, flat (thin), square, cylinder, coin, or button-shaped. The container member may be appropriately selected depending on battery size and use of the battery.

The above battery may be electrically connected in series or in parallel, combined with other batteries, and/or combined with casings and the like, to configure a battery pack. Conventionally known configurations may be selected for the battery pack, as appropriate. Details of an example of a specific configuration of the battery pack is described later.

<Method for Measuring Specific Surface Area>

For measuring specific area, used is a method where molecules of a known adsorption occupancy area is adsorbed onto a powder particle surface at a temperature of liquid nitrogen, and the specific surface area of the sample is calculated from the amount. The BET method using low temperature and low humidity physical adsorption of inert gas is the most widely used method. This BET method is a method based on BET theory, which is the most famous theory as a method for calculating the specific surface area in which Langmuir theory, which is a monomolecular layer adsorption theory, is extended to multimolecular layer adsorption. The thus-obtained specific surface area is referred to as BET specific surface area.

<Measurement of Electrode Active Material-Containing Layer>

The positive electrode active material and composite oxide included in the positive electrode active material-containing layer, as well as the optionally included first sulfide solid electrolyte and other solid electrolyte, can be examined by the TEM-EDX measurement, ICP emission spectrometry, and XRD measurement described in the first embodiment, the second embodiment, and the third embodiment. Likewise, the negative electrode active material included in the negative electrode active material-containing layer, as well as the optionally included first sulfide solid electrolyte and other solid electrolyte, can be examined in a similar manner.

The electrode active material-containing layer to be measured can be collected from a battery, for instance, in substantially the same procedure as described previously. The details of each of TEM-EDX, ICP, and XRD measurements overlap with those in the first embodiment, the second embodiment, or the third embodiment, and description thereof is thus omitted.

<Measurement of Electrically-Insulating Layer>

The second sulfide solid electrolyte and other solid electrolyte included in the electrically-insulating layer can be examined as follows. Specifically, powder XRD measurement can be used to examine the crystal structure of the oxide included in the solid electrolyte. Then, the composition in the solid electrolyte can be determined by quantification using high-frequency ICP emission spectrometry.

The solid electrolyte included in the electrically-insulating layer can be collected from a battery, for instance, in the following manner, to prepare a measurement sample. First, the battery is made to be in a completely discharged state. Next, an electrode body is removed from the battery. In the electrode body removed from the battery, the positive electrode active material-containing layer and the negative electrode active material-containing layer can be scraped off by polishing. Thereby, the electrically-insulating layer can be collected from the battery. When a sheet-shaped composite oxide-containing layer is present between the positive electrode active material-containing layer and the electrically-insulating layer, this composite oxide-containing layer is also scraped off. The collected electrically-insulating layer is pulverized to an average particle size of about 10 μm.

(Powder X-Ray Diffraction Measurement)

The electrically-insulating layer pulverized in the above manner is used as a measurement sample to conduct powder XRD measurement in the same procedure as described in the second embodiment. Details of the measurement and details in the second embodiment overlap, and description thereof is thus omitted.

(Inductively-Coupled Plasma Emission Spectrometry)

The electrically-insulating layer pulverized as described above can be dissolved with acid to obtain a liquid sample including the solid electrolyte. In a case where a solid polymer electrolyte and/or a gel polymer electrolyte is included as organic electrolyte, the electrically-insulating layer is heated for a short time (e.g., about 1 hour at 500° C.) to thereby sinter away unnecessary components such as binder components. By dissolving the residue in acid, a liquid sample can be prepared. Here, hydrochloric acid, nitric acid, sulfuric acid, hydrogen fluoride, and the like may be used as the acid. The components in the solid electrolyte can be found by subjecting the liquid sample to ICP analysis.

The battery according to the fourth embodiment includes a positive electrode active material-containing layer that contains a positive electrode active material, a negative electrode active material-containing layer that contains a negative electrode active material, an electrically-insulating layer that contains a second sulfide solid electrolyte, and a composite oxide-containing layer in contact with at least part of the positive electrode active material. The electrically-insulating layer is positioned between the positive electrode active material-containing layer and the negative electrode active material-containing layer. The composite oxide-containing layer contains the composite oxide according to the first embodiment. In the battery, interface reactions between the active material surface and the sulfide solid electrolyte is suppressed, and there is little internal resistance. Even under a high temperature environment over a long time span, increase in internal resistance of the battery is little. Namely, there is provided a battery that can exhibit low internal resistance and excellent high temperature storage performance.

Fifth Embodiment

According to a fifth embodiment, a battery module is provided. The battery module according to the fifth embodiment includes plural of batteries according to the fourth embodiment.

In the battery module according to the fifth embodiment, single-batteries may be arranged to be electrically connected in series or in parallel, or may be arranged in combination of in-series connection and in-parallel connection.

An example of the battery module according to the fifth embodiment will be described next, with reference to the drawings.

Figure 7:
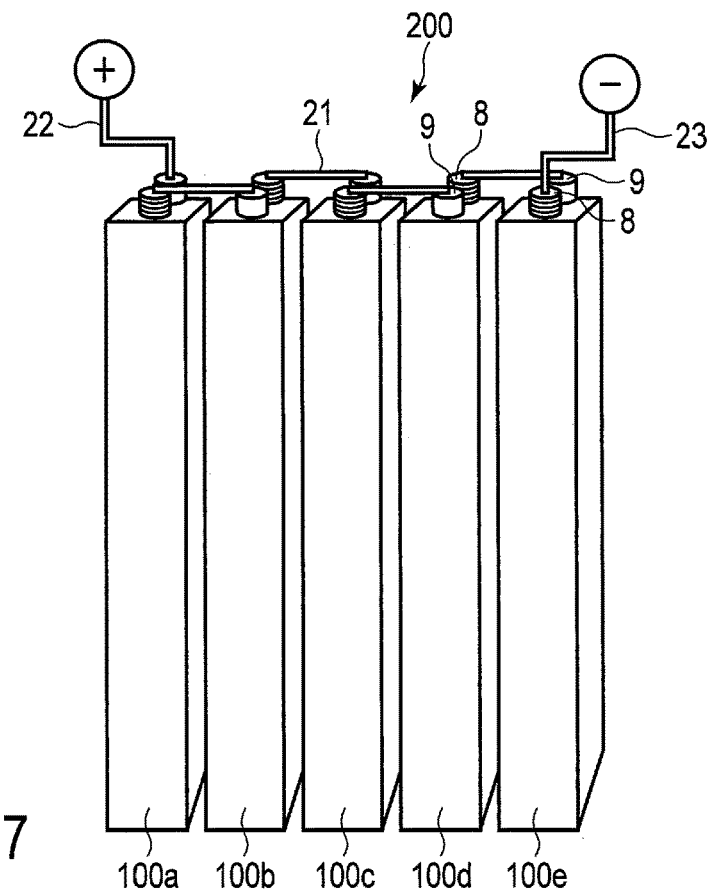
FIG. 7 is a perspective view schematically showing an example of a battery module according to an embodiment.

FIG. 7 is a perspective view schematically showing an example of the battery module according to the fifth embodiment. The battery module 200 shown in FIG. 7 includes five single-batteries 100a to 100e, four bus bars 21, a positive electrode-side lead 22, and a negative electrode-side lead 23. Each of the five single-batteries 100a to 100e is the battery according to the fourth embodiment.

The bus bar 21 connects, for example, a negative electrode terminal 8 of one single-battery 100a and a positive electrode terminal 9 of the single-battery 100b positioned adjacent. In such a manner, the five single-batteries 100 are thus connected in series by the four bus bars 21. That is, the battery module 200 shown in FIG. 7 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 9 of at least one battery among the five single-batteries 100a to 100e is electrically connected to the positive electrode-side lead 22 for external connection. In addition, the negative electrode terminal 8 of at least one battery among the five single-batteries 100a to 100e is electrically connected to the negative electrode-side lead 23 for external connection.

The battery module according to the fifth embodiment includes the battery according to the fourth embodiment. Thus, the battery module can exhibit low internal resistance and excellent high temperature storage performance.

Sixth Embodiment

According to a sixth embodiment, a battery pack is provided. The battery pack includes the battery module according to the fifth embodiment. The battery pack may include a single battery according to the fourth embodiment, in place of the battery module according to the fifth embodiment.

The battery pack according to the sixth embodiment may further include a protective circuit. The protective circuit has a function to control charging and discharging of the battery. Alternatively, a circuit included in equipment where the battery pack serves as a power source (for example, electronic devices, automobiles, and the like) may be used as the protective circuit for the battery pack.

Moreover, the battery pack according to the sixth embodiment may further include an external power distribution terminal. The external power distribution terminal is configured to externally output current from the battery, and/or to input external current into the battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the sixth embodiment will be described with reference to the drawings.

FIG. 8 is an exploded perspective view schematically showing an example of the battery pack according to the sixth embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a square-bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a battery according to the fourth embodiment. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode(s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces a surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of over-charge, over-discharge, and overcurrent of the single-battery(s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the sixth embodiment is provided with the battery according to the fourth embodiment or the battery module according to the fifth embodiment. Accordingly, the battery pack can exhibit low internal resistance and excellent high temperature storage performance.

Seventh Embodiment

According to a seventh embodiment, a vehicle is provided. The battery pack according to the sixth embodiment is installed on this vehicle.

In the vehicle according to the seventh embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the seventh embodiment include two-wheeled to four-wheeled hybrid electric automobiles, two-wheeled to four-wheeled electric automobiles, electrically assisted bicycles, and railway cars.

In the vehicle according to the seventh embodiment, the installing position of the battery pack is not particularly limited. For example, when installing the battery pack on an automobile, the battery pack may be installed in the engine compartment of the automobile, in rear parts of the vehicle body, or under seats.

The vehicle according to the seventh embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the seventh embodiment is explained below, with reference to the drawings.

FIG. 10 is a partially see-through diagram schematically showing an example of a vehicle according to the seventh embodiment.

A vehicle 400, shown in FIG. 10 includes a vehicle body 40 and a battery pack 300 according to the sixth embodiment. In the example shown in FIG. 10, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 10, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 11:
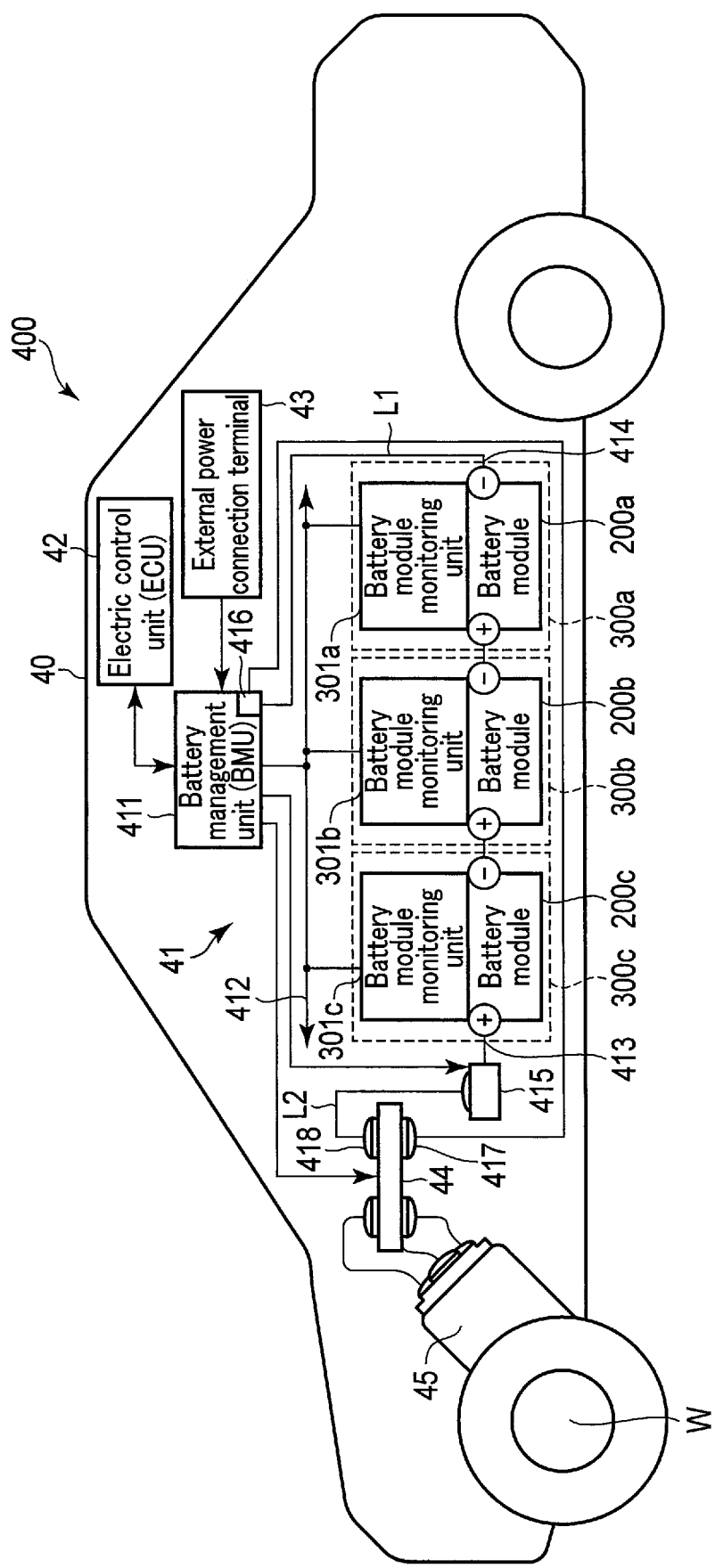
FIG. 11 is a diagram schematically showing an example of a control system related to an electric system in the vehicle according to the embodiment.

Next, with reference to FIG. 11, an aspect of operation of the vehicle according to the seventh embodiment is explained.

FIG. 11 is a diagram schematically showing an example of a control system related to an electric system in the vehicle according to the seventh embodiment. A vehicle 400, shown in FIG. 11, is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the battery according to the fourth embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 11) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44.

The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the seventh embodiment is installed with the battery pack according to the sixth embodiment. Thus, a high performance vehicle can be provided, by virtue of low internal resistance of the battery pack. A vehicle of high reliability can be provided, by virtue of the battery pack being excellent in high temperature storage performance.

EXAMPLES

Hereinafter, Examples will be described.

Example 1

<Synthesis of Solid Electrolyte>

$Li_2S$—$GeS_2$—$P_2S_5$ was prepared, as a solid electrolyte. Specifically, the solid electrolyte was synthesized as follows.

$Li_2S$ powder, $P_2S_5$ powder, and $GeS_2$ powder were provided. These powders were mixed at a prescribed ratio by stirring for 20 h in a dry environment under an Ar atmosphere, using a ball mill. Sulfur was added to the mixed powder, and the resulting mixture was mixed using a mortar and a pestle. Then, the resulting powder was press-molded into a pellet form. The resulting pellet was put into a sealed glass container, which was then heated on a hot plate. The hot plate was heated up to 240° C., at a rate of temperature rise of 10° C./min. When 16 hours passed after the hot plate temperature had reached 240° C., the pellet was transferred to a cooling shelf. The heat-treated pellet was pulverized using a mortar and a pestle to yield a particle-shaped solid electrolyte.

<Preparation of Positive Electrode Mixture>

As described below, a composite oxide-containing layer was formed on a positive electrode active material by a method that includes coating the active material particle with a precursor solution for the composite oxide-containing layer.

As the positive electrode active material, lithium-nickel-cobalt-manganese composite oxide $LiNi_{1/3}Co_{1/3}Mn_{1/3}O_2$ of a form of secondary particles was provided. The secondary particles had an average particle size (D50) of 5 μm.

$LiOC_2H_5$, $Nb(OC_2H_5)_5$, and $Ta(OC_2H_5)_5$ were dissolved in ethanol to prepare the precursor solution for the composite oxide-containing layer. The amount of each compound added to ethanol was adjusted, as appropriate, so as to have a prescribed molar ratio at which the composition designated below in Table 1 was obtained.

Using a tumbling fluidized bed coating device (MP-01, manufactured by Powrex corp.), the positive electrode active material was coated with the above precursor solution. Specifically, positive electrode active material powder (secondary particles of $LiNi_{1/3}Co_{1/3}Mn_{1/3}O_2$) was put into the tumbling fluidized bed coating device and fluidizer gas was introduced thereto. Dry air at 50° C. was used as the fluidizer gas and was introduced into the device at a flow rate of 0.25 m³/min. While circulating the positive electrode active material powder in the device by scooping up the powder with the flowing motion of dry air, the above precursor solution was sprayed in through a spray nozzle. The precursor was fed into the device at a rate of 4 g/min. The tumbling fluidized bed coating device was operated over 8 h. Thus obtained was a positive electrode active material powder coated with the precursor for the composite oxide-containing layer.

The precursor-coated powder was heated in an electric furnace for 5 hours under conditions at 350° C. in the air. Thus obtained were positive electrode active material composite material particles including the positive electrode active material particles and the composite oxide-containing layer coating the particles.

The resulting positive electrode active material composite material and the above-mentioned solid electrolyte were blended at a mass ratio of 1:1 to obtain a positive electrode mixture.

<Preparation of Negative Electrode Mixture>

As a negative electrode active material, graphite was provided. The provided negative electrode active material and the solid electrolyte were blended at a mass ratio of 1:1 to obtain a negative electrode mixture.

<Manufacture of Battery>

The positive electrode mixture was filled into a cylindrical container. The positive electrode mixture powder was pressed to form a positive electrode active material-containing layer (positive electrode mixture layer). The solid electrolyte was loaded on top of the positive electrode active material-containing layer. The solid electrolyte powder was pressed to form an electrically-insulating layer. The negative electrode mixture was loaded on top of the electrically-insulating layer. The negative electrode mixture powder was pressed to form a negative electrode active material-containing layer (negative electrode mixture layer).

A positive electrode terminal was electrically connected to the positive electrode active material-containing layer. A negative electrode terminal was electrically connected to the negative electrode active material-containing layer. In this way, a battery was manufactured.

Example 2

When a precursor solution for a composite oxide-containing layer was prepared, the amount of each compound added to ethanol was adjusted, so as to have a molar ratio at which the composition designated in Table 1 was obtained. Except for that, the same coating method as used in Example 1 was adopted to obtain positive electrode active material composite material particles including positive electrode active material particles and the composite oxide-containing layer covering the particles. Except that the resulting positive electrode active material composite material was used, a battery was manufactured following the same procedure as in Example 1.

Example 3

As described below, a battery was manufactured following the same procedure as in Example 2, except that a liquid electrolyte was impregnated into each active material-containing layer and the electrically-insulating layer.

<Synthesis of Solid Electrolyte>

A solid electrolyte was synthesized by the same procedure as in Example 1.

<Preparation of Positive Electrode Mixture>

When a precursor solution for a composite oxide-containing layer was prepared, the amount of each compound added to ethanol was adjusted so as to have a molar ratio at which the composition designated in Table 1 was obtained. Except for that, the same coating method as used in Example 1 was adopted to obtain positive electrode active material composite material particles including positive electrode active material particles and the composite oxide-containing layer covering the particles. The resulting positive electrode active material composite material and the above-mentioned solid electrolyte were blended at amass ratio of 1:1 to obtain a positive electrode mixture.

<Preparation of Negative Electrode Mixture>

A negative electrode mixture was prepared by the same procedure as in Example 1.

<Preparation of Liquid Electrolyte>

$LiPF_6$ was dissolved at a concentration of 1.5 M into propylene carbonate to prepare a liquid electrolyte.

<Manufacture of Battery>

The positive electrode mixture was filled into a cylindrical container. The positive electrode mixture was pressurized to form a positive electrode active material-containing layer. The solid electrolyte was loaded on top of the positive electrode active material-containing layer. The solid electrolyte was pressurized to form an electrically-insulating layer. The negative electrode mixture was loaded on top of the electrically-insulating layer. The negative electrode mixture was pressurized to form a negative electrode active material-containing layer.

Then, 0.5 Vol % of the above liquid electrolyte with respect to a total volume of the positive electrode active material-containing layer, the electrically-insulating layer, and the negative electrode active material-containing layer was dripped onto the pressed molding. At a side opposite to the side of the pressed molding onto which the liquid electrolyte was dripped, an opening of the cylindrical container was exposed to a vacuum atmosphere for 30 minutes. In this way, the liquid electrolyte was impregnated in vacuo into the pressed molding.

A positive electrode terminal was electrically connected to the positive electrode active material-containing layer. A negative electrode terminal was electrically connected to the negative electrode active material-containing layer. In this way, a battery was manufactured.

Example 4

As described below, a battery was manufactured following the same procedure as in Example 3, except that the liquid electrolyte was gelled to obtain a composite electrolyte.

<Synthesis of Solid Electrolyte>

A solid electrolyte was synthesized by the same procedure as in Example 1.

<Preparation of Positive Electrode Mixture>

When a precursor solution for a composite oxide-containing layer was prepared, the amount of each compound added to ethanol was adjusted so as to have a molar ratio at which the composition designated in Table 1 was obtained. Except for that, the same coating method as used in Example 1 was adopted to obtain positive electrode active material composite material particles including positive electrode active material particles and the composite oxide-containing layer covering the particles. The resulting positive electrode active material composite material and the above-mentioned solid electrolyte were blended at a mass ratio of 1:1 to obtain a positive electrode mixture.

<Preparation of Negative Electrode Mixture>

A negative electrode mixture was prepared by the same procedure as in Example 1.

<Preparation of Gel Electrolyte>

$LiPF_6$ was dissolved at a concentration of 1.5 M into propylene carbonate to prepare a liquid electrolyte. Then, 2 mass % of polyacrylonitrile (PAN) polymer with respect to $LiPF_6$ was added to the resulting liquid electrolyte and mixed. As a radical agent for initiating polymerization, 2,2'-azobis-4-methoxy-2,4-dimethylvaleronitrile was added to the mixed liquid to yield a precursor for gel electrolyte.

<Manufacture of Battery>

The positive electrode mixture was filled into a cylindrical container. The positive electrode mixture was pressurized to form a positive electrode active material-containing layer. The solid electrolyte was loaded on top of the positive electrode active material-containing layer. The solid electrolyte was pressurized to form an electrically-insulating layer. The negative electrode mixture was loaded on top of the electrically-insulating layer. The negative electrode mixture was pressurized to form a negative electrode active material-containing layer.

Then, 0.5 Vol % of the above precursor for gel electrolyte with respect to the total volume of the positive electrode active material-containing layer, the electrically-insulating layer, and the negative electrode active material-containing layer was dripped onto the pressed molding. At a side opposite to the side of the pressed molding onto which the gel electrolyte precursor was dripped, an opening of the cylindrical container was exposed to a vacuum atmosphere for 30 minutes. In this way, the gel electrolyte precursor was impregnated in vacuo into the pressed molding. Subsequently, heating at 60° C. was carried out for 2 hours to make the precursor gelled completely. Thus obtained was the positive electrode active material-containing layer, the negative electrode active material-containing layer, and the electrically-insulating layer each containing the composite electrolyte including the gel electrolyte and the solid electrolyte.

A positive electrode terminal was electrically connected to the positive electrode active material-containing layer. A negative electrode terminal was electrically connected to the negative electrode active material-containing layer. In this way, a battery was manufactured.

Example 5

As described below, a battery was manufactured following the same procedure as in Example 2, except that a powder mixing method instead of the coating method was used to form a composite oxide-containing layer on a positive electrode active material.

As the positive electrode active material, the same $LiNi_{1/3}Co_{1/3}Mn_{1/3}O_2$ as that of Example 1 was provided.

Lithium carbonate ($Li_2CO_3$) powder, niobium oxide ($Nb_2O_5$) powder, and tantalum oxide ($Ta_2O_5$) powder were provided. These powders were weighed so as to have a prescribed molar ratio at which the composition designated in Table 1 was obtained. The respective weighed oxide powders were mixed, using a ball mill, for 1 hour. Next, the mixed powder was pre-fired at 850° C. for 2 h. Subsequently, firing at 1000° C. was carried out for 5 hours. Then, the resulting solid phase-synthesized powder was wet-mixed using a bead mill to an average particle size of 100 nm, and composite oxide powder was thus obtained. The wet mixing was carried out at a circumferential speed of 16 m/s for 10 h.

After that, the composite oxide powder and the positive electrode active material were put into a ball mill and were mixed at 150 rpm for 2 hours. In this way, the composite oxide powder was attached onto the active material surface. As such, the powder mixing method was used to form the composite oxide-containing layer on the positive electrode active material surface, to thereby obtain positive electrode active material composite material particles including the positive electrode active material and the composite oxide-containing layer.

The resulting positive electrode active material composite material and the above-mentioned solid electrolyte were blended at a mass ratio of 1:1 to obtain a positive electrode mixture. A battery was manufactured following the same procedure as in Example 1, except that the resulting positive electrode mixture was used.

Example 6

As described below, a battery was manufactured following the same procedure as in Example 2, except that instead of forming the composite oxide-containing layer on the positive electrode active material particle surface, a composite oxide-containing layer molded into a sheet-shape was used.

$Li_2CO_3$ powder, $Nb_2O_5$ powder, and $Ta_2O_5$ powder were weighed so as to have a prescribed molar ratio at which the composition designated in Table 1 was obtained. The respective weighed oxide powders were mixed, using a ball mill, for 1 hour. Next, the mixed powder was pre-fired at 850° C. for 2 hours. Subsequently, firing at 1000° C. was carried out for 5 hours. Then, the resulting solid phase-synthesized powder was wet-mixed using a bead mill, to an average particle size of 100 nm. The wet mixing was carried out at a circumferential speed of 16 m/s for 10 hours.

After that, the mixed powder was dispersed at a solid content of 65% into N-methylpyrrolidone. Then, 2 parts by mass of polyvinylidene fluoride (PVdF) was added to the dispersion to prepare an application liquid. The application liquid was applied and dried on a glass substrate at a film thickness of 10 μm, and the resulting film was peeled therefrom to obtain a sheet-shaped composite oxide-containing layer.

<Synthesis of Solid Electrolyte>

A solid electrolyte was synthesized by the same procedure as in Example 1.

<Preparation of Positive Electrode Mixture>

As the positive electrode active material, the same $LiNi_{1/3}Co_{1/3}Mn_{1/3}O_2$ as that of Example 1 was provided. The positive electrode active material and the above-mentioned solid electrolyte were blended at a mass ratio of 1:1 to obtain a positive electrode mixture.

<Preparation of Negative Electrode Mixture>

A negative electrode mixture was prepared by the same procedure as in Example 1.

<Manufacture of Battery>

The positive electrode mixture was filled into a cylindrical container. The positive electrode mixture powder was pressed to form a positive electrode active material-containing layer (positive electrode mixture layer). The sheet-shaped composite oxide-containing layer was placed onto the positive electrode active material-containing layer. Then, the solid electrolyte was loaded thereon. The solid electrolyte powder was pressed to form an electrically-insulating layer. The negative electrode mixture was loaded on top of the electrically-insulating layer. The negative electrode mixture powder was pressed to form a negative electrode active material-containing layer (negative electrode mixture layer).

A positive electrode terminal was electrically connected to the positive electrode active material-containing layer. A negative electrode terminal was electrically connected to the negative electrode active material-containing layer. In this way, a battery was manufactured.

Examples 7 to 8

When a precursor solution for a composite oxide-containing layer was prepared, the amount of each compound added to ethanol was adjusted so as to have a molar ratio at which the composition designated in Table 1 was obtained. Except for that, the same coating method as used in Example 1 was adopted to obtain positive electrode active material composite material particles including positive electrode active material particles and the composite oxide-containing layer covering the particles. A battery was manufactured following the same procedure as in Example 1, except that the resulting positive electrode active material composite material was used.

Examples 9 to 11

A battery was manufactured following the same procedure as in Example 1, except that the composite oxide-containing layer having each composition designated in Table 1 was formed on a positive electrode active material.

Specifically, $LiOC_2H_5$, $Nb(OC_2H_5)_5$, $KOC_2H_5$, and $Ta(OC_2H_5)_5$ were dissolved in ethanol to prepare a precursor solution for a composite oxide-containing layer. The amount of each compound added to ethanol was adjusted, as appropriate, so as to have a prescribed molar ratio at which the composition designated below in Table 1 was obtained. Except for that, the same coating method as used in Example 1 was adopted to obtain positive electrode active material composite material particles including positive electrode active material particles and the composite oxide-containing layer covering the particles. A battery was manufactured following the same procedure as in Example 1, except that the resulting positive electrode active material composite material was used.

Examples 12 to 14

A battery was manufactured following the same procedure as in Example 1, except that the composite oxide-containing layer having each composition designated in Table 1 was formed on a positive electrode active material.

Specifically, $LiOC_2H_5$, $Nb(OC_2H_5)_5$, $Ta(OC_2H_5)_5$, and $Fe(OC_2H_5)_3$ were dissolved in ethanol to prepare a precursor solution for a composite oxide-containing layer. The amount of each compound added to ethanol was adjusted, as appropriate, so as to have a prescribed molar ratio at which the composition designated below in Table 1 was obtained. Except for that, the same coating method as used in Example 1 was adopted to obtain positive electrode active material composite material particles including positive electrode active material particles and the composite oxide-containing layer coating the particles. A battery was manufactured following the same procedure as in Example 1, except that the resulting positive electrode active material composite material was used, to manufacture a battery.

Example 15

A battery was manufactured following the same procedure as in Example 1, except that the composite oxide-containing layer having the composition designated in Table 1 was formed on a positive electrode active material.

Specifically, $LiOC_2H$, $Nb(OC_2H_5)_5$, $KOC_2H_5$, $Ta(OC_2H_5)_5$, and $Fe(OC_2H_5)_3$ were dissolved in ethanol to prepare a precursor solution for a composite oxide-containing layer. The amount of each compound added to ethanol was adjusted, as appropriate, so as to have a prescribed molar ratio at which the composition designated below in Table 1 was obtained. Except for that, the same coating method as used in Example 1 was adopted to obtain positive electrode active material composite material particles including positive electrode active material particles and the composite oxide-containing layer coating the particles. A battery was manufactured following the same procedure as in Example 1, except that the resulting positive electrode active material composite material was used.

Comparative Example 1

A battery was manufactured following the same procedure as in Example 1, except that the composite oxide-containing layer having the composition designated in Table 1 was formed on a positive electrode active material.

Specifically, $LiOC_2H_5$ and $Nb(OC_2H_5)_5$ were dissolved in ethanol to prepare a precursor solution for a composite oxide-containing layer. The amount of each compound added to ethanol was adjusted, as appropriate, so as to have a prescribed molar ratio at which the composition designated below in Table 1 was obtained. Except for that, the same coating method as used in Example 1 was adopted to obtain positive electrode active material composite material particles including positive electrode active material particles and the composite oxide-containing layer coating the particles. A battery was manufactured following the same procedure as in Example 1, except that the resulting positive electrode active material composite material was used.

Comparative Examples 2 to 3

A battery was manufactured following the same procedure as in Example 1, except that the composite oxide-containing layer having each composition designated in Table 1 was formed on a positive electrode active material.

Specifically, $LiOC_2H_5$, $Nb(OC_2H_5)_5$, and $Ta(OC_2H_5)_5$ were dissolved in ethanol to prepare a precursor solution for a composite oxide-containing layer. The amount of each compound added to ethanol was adjusted, as appropriate, so as to have a prescribed molar ratio at which the composition designated below in Table 1 was obtained. Except for that, the same coating method as used in Example 1 was adopted to obtain positive electrode active material composite material particles including positive electrode active material particles and the composite oxide-containing layer coating the particles. A battery was manufactured following the same procedure as in Example 1, except that the resulting positive electrode active material composite material was used.

Comparative Example 4

As described below, a battery was manufactured following the same procedure as in Example 5, except that, by a powder mixing method, a mixed powder of $LiNbO_3$ and $LiTaO_3$ was formed as a composite oxide-containing layer onto a positive electrode active material.

As the positive electrode active material, the same $LiNi_{1/3}Co_{1/3}Mn_{1/3}O_2$ as that of Example 1 was provided.

$LiNbO_3$ powder and $LiTaO_3$ powder were provided. $LiNbO_3$ powder and $LiTaO_3$ powder were blended, such that the mass ratio ($M_{Ta}/M_{Nb}$) of tantalum to niobium was 0.1%, to yield mixed powder.

After that, the mixed powder and the positive electrode active material were put into a ball mill and were mixed at 150 rpm for 2 hours. In this way, the synthesized powder was attached onto the active material surface. As such, a powder mixing method was used to form a composite oxide-containing layer on the positive electrode active material surface.

The resulting positive electrode active material and the above-mentioned solid electrolyte were blended at a mass ratio of 1:1 to obtain a positive electrode mixture. A battery was manufactured following the same procedure as in Example 1, except that the resulting positive electrode mixture was used.

Comparative Example 5

As described below, a battery was manufactured following the same procedure as in Example 5, except that, by a powder mixing method, a mixed powder of $LiNbO_3$ and $K_2O$ was formed as a composite oxide-containing layer onto a positive electrode active material.

As the positive electrode active material, the same $LiNi_{1/3}Co_{1/3}Mn_{1/3}O_2$ as that of Example 1 was provided.

$LiNbO_3$ powder and $K_2O$ powder were provided. $LiNbO_3$ powder and $K_2O$ powder were blended, such that the mass ratio ($M_K/M_{Nb}$) of potassium to niobium was 0.1%, to yield mixed powder.

After that, the mixed powder and the positive electrode active material were put into a ball mill and were mixed at 150 rpm for 2 hours. In this way, the synthesized powder was attached onto the active material surface. As such, a powder mixing method was used to form a composite oxide-containing layer on the positive electrode active material surface.

The resulting positive electrode active material and the above-mentioned solid electrolyte were blended at a mass ratio of 1:1 to obtain a positive electrode mixture. A battery was manufactured following the same procedure as in Example 1, except that the resulting positive electrode mixture was used.

The following Tables 1 and 2 summarize specifics of the composite oxide-containing layers and specifics of the electrolyte layers in each of Examples 1 to 15 and Comparative Examples 1 to 5. Specifically, Table 1 shows the composition of each composite oxide-containing layer, the values respectively for subscripts x, y, and z when the principal material in the composite oxide-containing layer is represented by the general formula $Li_{1-x}K_xNb_{1-y-z}Ta_yFe_zO_3$, and the respective mass ratios of K, Ta, and Fe to Nb. Table 2 shows the application form of each composite oxide-containing layer onto the positive electrode active material and the configuration of each electrolyte layer. With respect to Comparative Example 4, the mass ratio ($M_{Ta}/M_{Nb}$) of Ta to Nb indicates the mass ratio taking into account of the whole composite oxide-containing layer including not only the principal material $LiNbO_3$ but made of a $LiNb_3/LiTaO_3$ mixture. Likewise, with respect to comparative Example 5, the mass ratio ($M_K/M_{Nb}$) of K to Nb indicates the mass ratio taking into account of the whole composite oxide-containing layer made of a $LiNbO_3/K_2O$ mixture.

TABLE 1

| | Composition of composite oxide-containing layer $Li_{1-x}K_xNb_{1-y-z}Ta_yFe_zO_3$ | x | y | z | $M_K/M_{Nb}$ (mass %) | $M_{Ta}/M_{Nb}$ (mass %) | $M_{Fe}/M_{Nb}$ (mass %) |
|---|---|---|---|---|---|---|---|
| Example 1 | $LiNb_{0.99994}Ta_{0.00006}O_3$ | 0 | 0.00006 | 0 | 0.000 | 0.012 | 0.000 |
| Example 2 | $LiNb_{0.9995}Ta_{0.0005}O_3$ | 0 | 0.0005 | 0 | 0.000 | 0.097 | 0.000 |
| Example 3 | $LiNb_{0.9995}Ta_{0.0005}O_3$ | 0 | 0.0005 | 0 | 0.000 | 0.097 | 0.000 |
| Example 4 | $LiNb_{0.9995}Ta_{0.0005}O_3$ | 0 | 0.0005 | 0 | 0.000 | 0.097 | 0.000 |
| Example 5 | $LiNb_{0.9995}Ta_{0.0005}O_3$ | 0 | 0.0005 | 0 | 0.000 | 0.097 | 0.000 |
| Example 6 | $LiNb_{0.9995}Ta_{0.0005}O_3$ | 0 | 0.0005 | 0 | 0.000 | 0.097 | 0.000 |
| Example 7 | $LiNb_{0.999}Ta_{0.001}O_3$ | 0 | 0.001 | 0 | 0.000 | 0.195 | 0.000 |
| Example 8 | $LiNb_{0.995}Ta_{0.005}O_3$ | 0 | 0.005 | 0 | 0.000 | 0.979 | 0.000 |
| Example 9 | $Li_{0.9988}K_{0.0012}Nb_{0.9995}Ta_{0.0005}O_3$ | 0.0012 | 0.0005 | 0 | 0.051 | 0.097 | 0.000 |
| Example 10 | $Li_{0.994}K_{0.006}Nb_{0.9995}Ta_{0.0005}O_3$ | 0.006 | 0.0005 | 0 | 0.253 | 0.097 | 0.000 |
| Example 11 | $Li_{0.9763}K_{0.0237}Nb_{0.9995}Ta_{0.0005}O_3$ | 0.0237 | 0.0005 | 0 | 0.998 | 0.097 | 0.000 |
| Example 12 | $LiNb_{0.9993}Ta_{0.0005}Fe_{0.0002}O_3$ | 0 | 0.0005 | 0.0002 | 0.000 | 0.097 | 0.012 |
| Example 13 | $LiNb_{0.9955}Ta_{0.0005}Fe_{0.004}O_3$ | 0 | 0.0005 | 0.004 | 0.000 | 0.098 | 0.242 |
| Example 14 | $LiNb_{0.9915}Ta_{0.0005}Fe_{0.008}O_3$ | 0 | 0.0005 | 0.008 | 0.000 | 0.098 | 0.485 |
| Example 15 | $Li_{0.998}K_{0.002}Nb_{0.9975}Ta_{0.0005}Fe_{0.002}O_3$ | 0.002 | 0.0005 | 0.002 | 0.084 | 0.098 | 0.121 |
| Comparative Example 1 | $LiNbO_3$ | 0 | 0 | 0 | 0.000 | 0.000 | 0.000 |
| Comparative Example 2 | $LiNb_{0.99998}Ta_{0.00002}O_3$ | 0 | 0.00002 | 0 | 0.000 | 0.004 | 0.000 |
| Comparative Example 3 | $LiNb_{0.95}Ta_{0.05}O_3$ | 0 | 0.05 | 0 | 0.000 | 10.250 | 0.000 |
| Comparative Example 4 | $LiNbO_3 + LiTaO_3$ ($M_{Ta}/M_{Nb}$ = 0.1 mass %) | 0 | 0 | 0 | 0.000 | 0.100 | 0.000 |
| Comparative Example 5 | $LiNbO_3 + K_2O$ ($M_K/M_{Nb}$ = 0.1 mass %) | 0 | 0 | 0 | 0.100 | 0.000 | 0.000 |

TABLE 2

| | Application form of composite oxide-containing layer | Electrolyte layer |
|---|---|---|
| Example 1 | coating | $Li_2S$—$GeS_2$—$P_2S_5$ |
| Example 2 | coating | $Li_2S$—$GeS_2$—$P_2S_5$ |
| Example 3 | coating | $Li_2S$—$GeS_2$—$P_2S_5$ + Electrolyte liquid |
| Example 4 | coating | $Li_2S$—$GeS_2$—$P_2S_5$ + Gel electrolyte |
| Example 5 | powder mixing | $Li_2S$—$GeS_2$—$P_2S_5$ |
| Example 6 | powder sheet | $Li_2S$—$GeS_2$—$P_2S_5$ |
| Example 7 | coating | $Li_2S$—$GeS_2$—$P_2S_5$ |
| Example 8 | coating | $Li_2S$—$GeS_2$—$P_2S_5$ |
| Example 9 | coating | $Li_2S$—$GeS_2$—$P_2S_5$ |
| Example 10 | coating | $Li_2S$—$GeS_2$—$P_2S_5$ |
| Example 11 | coating | $Li_2S$—$GeS_2$—$P_2S_5$ |
| Example 12 | coating | $Li_2S$—$GeS_2$—$P_2S_5$ |
| Example 13 | coating | $Li_2S$—$GeS_2$—$P_2S_5$ |
| Example 14 | coating | $Li_2S$—$GeS_2$—$P_2S_5$ |
| Example 15 | coating | $Li_2S$—$GeS_2$—$P_2S_5$ |
| Comparative Example 1 | coating | $Li_2S$—$GeS_2$—$P_2S_5$ |
| Comparative Example 2 | coating | $Li_2S$—$GeS_2$—$P_2S_5$ |
| Comparative Example 3 | coating | $Li_2S$—$GeS_2$—$P_2S_5$ |
| Comparative Example 4 | powder mixing | $Li_2S$—$GeS_2$—$P_2S_5$ |
| Comparative Example 5 | powder mixing | $Li_2S$—$GeS_2$—$P_2S_5$ |

(Evaluation)
<Battery Resistance Measurement>

Regarding each of the batteries respectively manufactured in Examples 1 to 15 and Comparative Examples 1 to 5, the battery resistance was measured as follows.

Each battery was charged and discharged once at 0.001 C and at room temperature. Thereafter, each battery was set to a state of charge of 50%, and an AC impedance method was used to measure the internal resistance. Specifically, the batteries were each placed in a four-terminal measurement vessel filled with dry argon (Ar). Each four-terminal measurement vessel was placed in a thermostat set to 25° C., and maintained for 2 hours, and then, impedance was measured using an impedance analyzer 4192A manufactured by YOKOGAWA Hewlett-Packard. Each measured value was recorded as the initial resistance. Taking the value for the initial resistance of the cell of Comparative Example 1 to be 1.0, as reference, the ratio of the initial resistance of each battery in other Comparative Examples and Examples with respect to the reference was calculated.

Next, each battery was charged again at 0.001 C to a fully charged state, was placed in a thermostatic chamber at 45° C., and was then stored for 48 h. After the storage, the resistance was measured under the same conditions as for the initial resistance measurement. Regarding each battery, an increase in the internal resistance with respect to the initial resistance value was calculated as a resistance increase rate. Even if the initial resistance is high, under the circumstance where the resistance increase rate is low, the battery resistance after the storage is low in view of the overall result. As the battery resistance after storage, calculated was a value where each battery initial resistance was multiplied by the resistance increase rate after storage.

The following Table 3 shows the resistance measurement results. Specifically, the initial resistance, the resistance increase rate after storage, and the resistance after storage with respect to each battery are shown.

TABLE 3

| | Initial resistance | Resistance increase rate after 48 h of storage at 45° C. | Resistance after storage |
|---|---|---|---|
| Example 1 | 1.00 | 2.39 | 2.39 |
| Example 2 | 1.02 | 1.68 | 1.71 |
| Example 3 | 0.78 | 2.05 | 1.60 |
| Example 4 | 0.85 | 1.87 | 1.59 |
| Example 5 | 0.94 | 1.74 | 1.64 |
| Example 6 | 0.92 | 1.80 | 1.66 |
| Example 7 | 1.06 | 1.55 | 1.64 |
| Example 8 | 1.25 | 1.43 | 1.79 |

TABLE 3-continued

| | Initial resistance | Resistance increase rate after 48 h of storage at 45° C. | Resistance after storage |
|---|---|---|---|
| Example 9 | 1.03 | 1.60 | 1.65 |
| Example 10 | 1.10 | 1.53 | 1.68 |
| Example 11 | 1.23 | 1.21 | 1.49 |
| Example 12 | 1.01 | 1.72 | 1.74 |
| Example 13 | 0.99 | 1.84 | 1.82 |
| Example 14 | 0.97 | 2.01 | 1.95 |
| Example 15 | 1.00 | 1.36 | 1.36 |
| Comparative Example 1 | 1.00 | 3.57 | 3.57 |
| Comparative Example 2 | 1.00 | 3.08 | 3.08 |
| Comparative Example 3 | 2.85 | 1.36 | 3.88 |
| Comparative Example 4 | 1.02 | 3.60 | 3.67 |
| Comparative Example 5 | 1.08 | 3.41 | 3.68 |

In the initial resistance values shown in Table 3, it is apparent that there are increases and a decreases depending on the difference in the forms of composite oxide-containing layers and in the contents of elements added. The batteries manufactured in Examples 1 to 15 had lower resistance after storage at 45° C. than the batteries in Comparative Examples 1 to 5. The results have demonstrated that use of a composite oxide-containing layer according to each previously described embodiment causes a reaction suppression effect to be obtained stably even upon high-temperature storage, thereby suppressing an increase in the resistance.

The composite oxide according to at least one embodiment and example described above contains lithium, niobium, and tantalum. A mass ratio of tantalum to niobium contained in the composite oxide is in a range of from 0.01% to 1.0%. According to the above composite oxide, a composite oxide-containing layer that can, in a battery including a sulfide solid electrolyte, suppress interface reaction between the active material surface and the sulfide solid electrolyte and suppress an increase in the internal resistance of the battery under a high-temperature environment over a long period of time. Accordingly, there can be provided an active material composite material and electrode that can realize a battery having low internal resistance and excellent high temperature storage performance, a battery and battery pack having low internal resistance and excellent high temperature storage performance, and a vehicle including this battery pack.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A composite oxide comprising lithium, niobium, and tantalum, a mass ratio of tantalum with respect to niobium being in a range of from $1 \times 10^{-4}$ to 0.010.

2. The composite oxide according to claim 1, wherein the composite oxide is represented by general formula $Li_{1-x}K_xNb_{1-y-z}Ta_yFe_zO_3$, where subscript x is within a range of $0 \leq x \leq 2.4 \times 10^{-2}$, and subscript y is within a range of $5.1 \times 10^{-5} \leq y \leq 5.1 \times 10^{-3}$, and subscript z is within a range of $0 \leq z \leq 8.2 \times 10^{-3}$.

3. The composite oxide according to claim 1, further comprising potassium, a mass ratio of the potassium with respect to the niobium being in a range of from $5 \times 10^{-4}$ to 0.010.

4. The composite oxide according to claim 1 further comprising iron, a mass ratio of the iron with respect to the niobium being in a range of from $1 \times 10^{-4}$ to $5 \times 10^{-3}$.

5. An active material composite material comprising:
an active material particle; and
a composite oxide-containing layer in contact with at least part of a surface of the active material particle, the composite oxide-containing layer comprising the composite oxide according to claim 1.

6. An electrode comprising:
an active material-containing layer comprising an active material; and
a composite oxide-containing layer in contact with at least a portion of the active material, the composite oxide-containing layer comprising the composite oxide according to claim 1.

7. The electrode according to claim 6, wherein the active material has a particulate shape, and
the composite oxide-containing layer covers at least part of a particle surface of the active material.

8. The electrode according to claim 6, wherein the composite oxide-containing layer is provided on at least one surface of the active material-containing layer.

9. The electrode according to claim 6, wherein the active material-containing layer comprises at least one first sulfide solid electrolyte selected from the group consisting of $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $Li_3PO_4$—$Li_2S$—$SiS$, $LiI$—$Li_2S$—$P_2O_5$, $LiI$—$Li_3PO_4$—$P_2S_5$, $Li_2S$—$P_2S_5$, $Li_2S$—$GeS_2$—$P_2S_5$, a glass-ceramic material represented by general formula $Li_{4-w}Ge_{1-w}P_wS_4$ where subscript w is within a range of $0.7 \leq w \leq 1$, and halides having part of a composition of each material substituted by a halogen.

10. A battery comprising:
a positive electrode active material-containing layer comprising a positive electrode active material;
a negative electrode active material-containing layer comprising a negative electrode active material;
an electrically-insulating layer comprising a second sulfide solid electrolyte, the electrically-insulating layer being disposed between the positive electrode active material-containing layer and the negative electrode active material-containing layer; and
a composite oxide-containing layer in contact with at least part of the positive electrode active material, the composite oxide-containing layer comprising the composite oxide according to claim 1.

11. The battery according to claim 10, wherein the positive electrode active material has a particulate shape, and the composite oxide-containing layer covers at least part of a particle surface of the positive electrode active material.

12. The battery according to claim 10, wherein the composite oxide-containing layer is disposed between the positive electrode active material-containing layer and the electrically-insulating layer.

13. A battery pack comprising the battery according to claim 10.

14. The battery pack according to claim 13, further comprising:
an external power distribution terminal; and
a protective circuit.

15. The battery pack according to claim 13, comprising plural of the battery, the batteries being electrically connected in series, in parallel, or in a combination of in-series and in-parallel.

16. A vehicle comprising the battery pack according to claim 13.

17. The vehicle according to claim 16, wherein the vehicle comprises a mechanism configured to convert kinetic energy of the vehicle into regenerative energy.

* * * * *